United States Patent
Jayaram et al.

(10) Patent No.: US 7,698,016 B2
(45) Date of Patent: *Apr. 13, 2010

(54) FEATURE-BASED TRANSLATION SYSTEM AND METHOD

(75) Inventors: Sankar Jayaram, Pullman, WA (US); Uma Jayaram, Pullman, WA (US); David M. Cramer, Pullman, WA (US); Daniel J. Evans, West Richland, WA (US); Franklin W. Taylor, Spokane, WA (US); Michael M. McDonald, Colbert, WA (US)

(73) Assignee: TTI Acquisition Corporation, Spokane, WA (US)

( * ) Notice: Subject to any disclaimer, the term of this patent is extended or adjusted under 35 U.S.C. 154(b) by 1161 days.

This patent is subject to a terminal disclaimer.

(21) Appl. No.: 10/781,497

(22) Filed: Feb. 17, 2004

(65) Prior Publication Data

US 2005/0046624 A1  Mar. 3, 2005

Related U.S. Application Data

(60) Provisional application No. 60/448,350, filed on Feb. 18, 2003.

(51) Int. Cl.
*G06F 19/00* (2006.01)
(52) U.S. Cl. .......................... 700/180; 703/22; 345/419
(58) Field of Classification Search ................. 700/180, 700/182; 706/919; 715/964; 703/22; 345/419
See application file for complete search history.

(56) References Cited

U.S. PATENT DOCUMENTS

| | | | |
|---|---|---|---|
| 4,831,549 A | 5/1989 | Red et al. ................... 364/513 |
| 4,847,788 A | 7/1989 | Shimada ..................... 364/522 |
| 4,943,933 A | 7/1990 | Miyamoto et al. .......... 364/513 |
| 5,212,770 A | 5/1993 | Smith et al. ................. 395/155 |
| 5,369,744 A | 11/1994 | Fukushima et al. ......... 395/162 |
| 5,581,665 A | 12/1996 | Sugiura et al. ............... 395/86 |
| 5,615,317 A | 3/1997 | Freitag ....................... 395/119 |

(Continued)

FOREIGN PATENT DOCUMENTS

WO      WO 02/37406      10/2001

OTHER PUBLICATIONS

Moseley, Lonnie E; Boodey, David M., "Mastering Microsoft Office 97", 1997, second edition, sybex.*

(Continued)

*Primary Examiner*—Kidest Bahta
(74) *Attorney, Agent, or Firm*—Wells St. John P.S.

(57) ABSTRACT

A system having a server having processing circuitry and an operation manager configured to compare source geometric data of each of a plurality of features in a source geometric model with target geometric data of respective features in a target geometric model, and operative to identify discrepancies in respective features therebetween. The server is configured to rectify discrepancies in a feature after generating the feature and prior to generating another feature among the plurality of features. The system further includes a communication link, at least one client communicating with the server over the communication link, and an interrupt interface provided by one of the at least one client and the server and operative to notify a user of the presence of an inability to automatically generate an accurate representation of a feature of the source geometric model in the target geometric model.

30 Claims, 17 Drawing Sheets

U.S. PATENT DOCUMENTS

| | | | | |
|---|---|---|---|---|
| 5,691,909 | A | 11/1997 | Frey et al. | 364/474.01 |
| 5,715,459 | A | 2/1998 | Celi, Jr. et al. | 395/681 |
| 5,745,761 | A | 4/1998 | Celi, Jr. et al. | 395/681 |
| 5,745,762 | A | 4/1998 | Celi, Jr. et al. | 395/681 |
| 5,813,018 | A | 9/1998 | Kaji et al. | 707/502 |
| 5,825,368 | A | 10/1998 | Wilks | 345/440 |
| 5,892,939 | A * | 4/1999 | Call et al. | 703/23 |
| 5,990,897 | A | 11/1999 | Hanratty | 345/420 |
| 6,173,075 | B1 | 1/2001 | Collins | 382/203 |
| 6,188,432 | B1 | 2/2001 | Ejima | 348/240 |
| 6,205,452 | B1 | 3/2001 | Warmus et al. | 707/500 |
| 6,211,814 | B1 | 4/2001 | Benjamin et al. | 342/185 |
| 6,420,698 | B1 * | 7/2002 | Dimsdale | 250/234 |
| 6,614,430 | B1 * | 9/2003 | Rappoport | 345/420 |
| 6,828,963 | B1 * | 12/2004 | Rappoport | 345/419 |
| 6,985,835 | B1 * | 1/2006 | Etzion et al. | 703/1 |
| 2002/0060650 | A1 | 5/2002 | Wakashiro et al. | 345/9 |
| 2002/0120920 | A1 | 8/2002 | Jayaram et al. | 717/137 |
| 2002/0123812 | A1 | 9/2002 | Jayaram et al. | 700/98 |
| 2002/0143823 | A1 | 10/2002 | Stevens | 707/523 |
| 2003/0009315 | A1 | 1/2003 | Thomas et al. | 703/1 |
| 2003/0120707 | A1 * | 6/2003 | Bogdan et al. | 709/106 |
| 2003/0135846 | A1 | 7/2003 | Jayaram et al. | 717/137 |
| 2003/0195899 | A1 * | 10/2003 | Tsao | 707/104.1 |
| 2005/0071847 | A1 * | 3/2005 | Bentley et al. | 719/310 |

OTHER PUBLICATIONS

LaCourse, Don; "3D modelservr translates and heals models via the web", Feb. 2000, CADalyst, vol. 17, No. 2.*

Kroszynsk, Uri I., Palstroem, Bjarne; Trostman, Erik; Schlechtendahl, Ernst G; "Geometric Data Transfer Between CAD system: Solid Models", 1989, IEEE Computer Graphics & Applications, vol. 9, issue 5.*

U.S. Appl. No. 60/243,848, Jayaram et al.

* cited by examiner

EXTRUDED CUT TO BLIND DEPTH

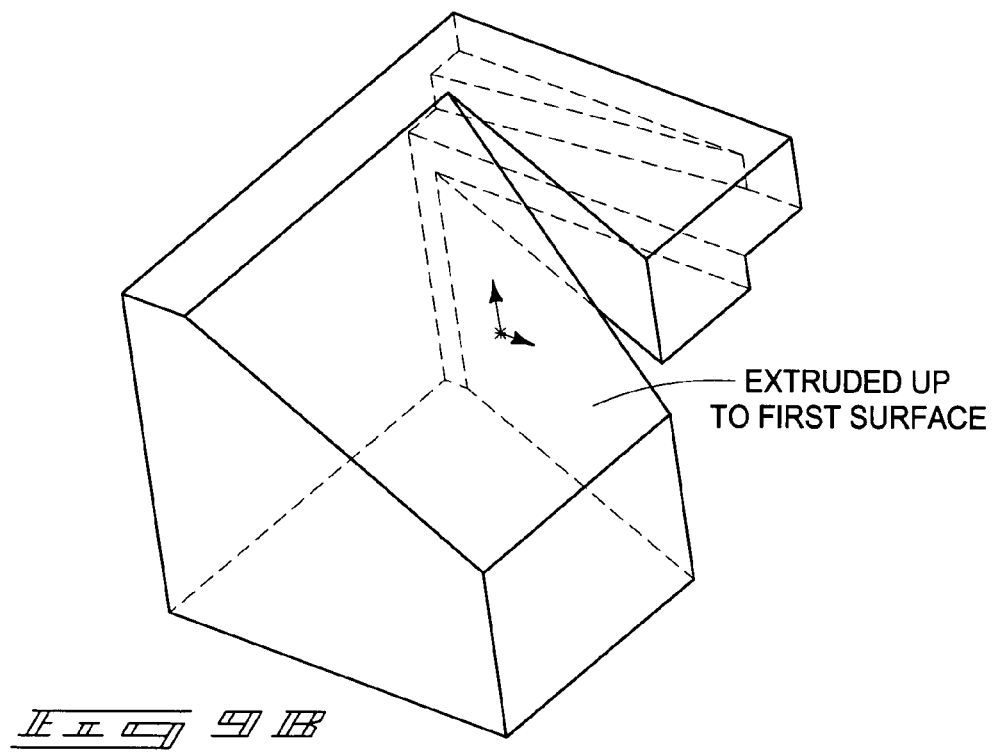
Fig 9B — EXTRUDED UP TO FIRST SURFACE
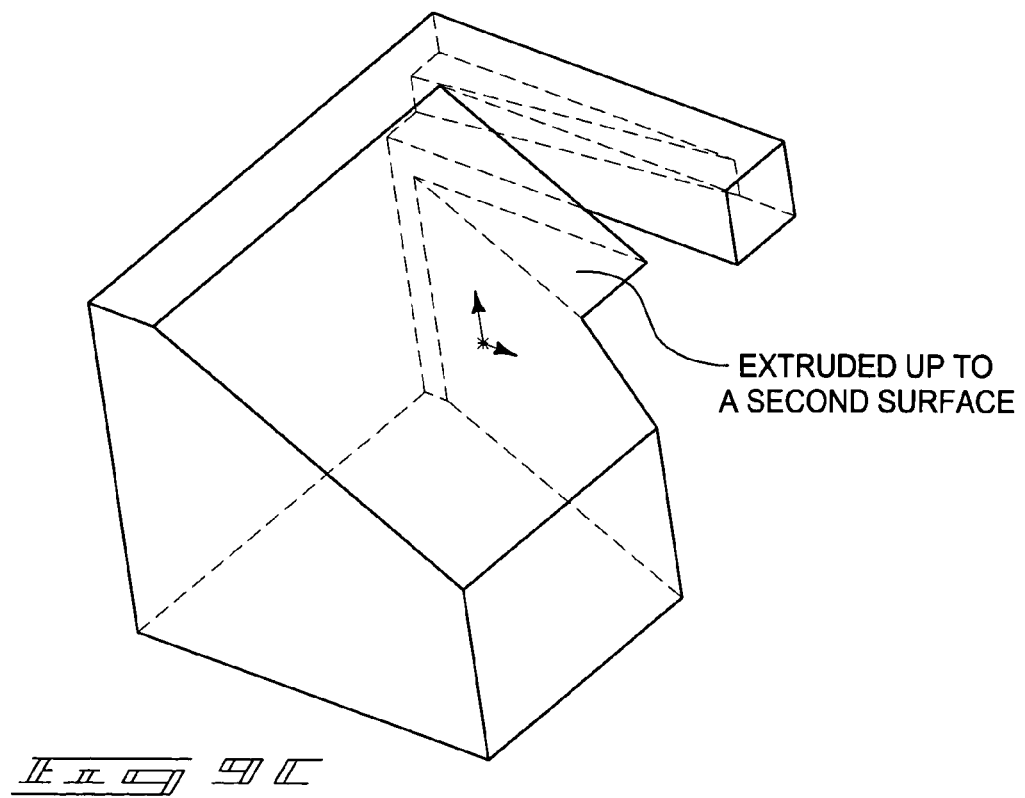
Fig 9C — EXTRUDED UP TO A SECOND SURFACE

EXTRUDED UP TO A THIRD AND LAST SURFACE

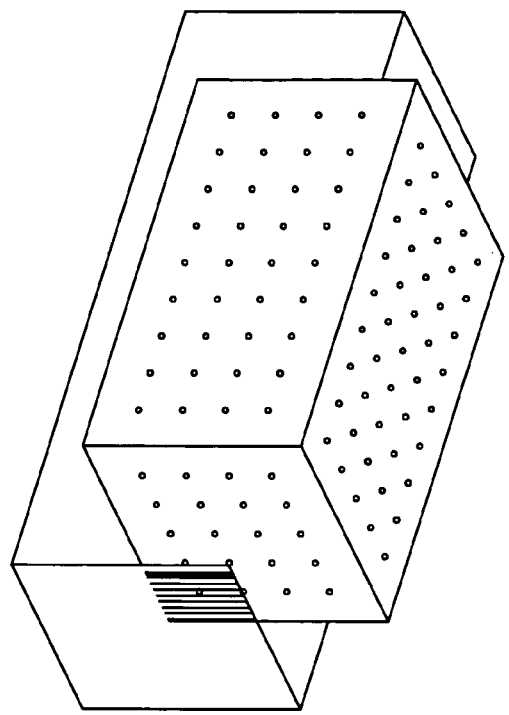 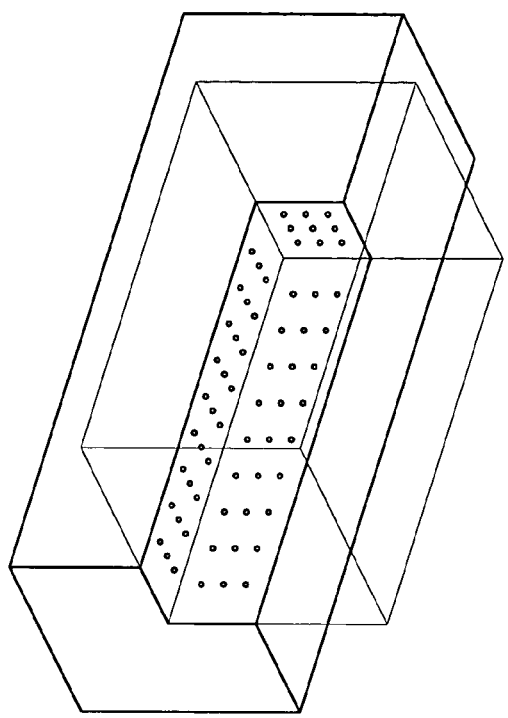
Fig. 11A
Fig. 11B
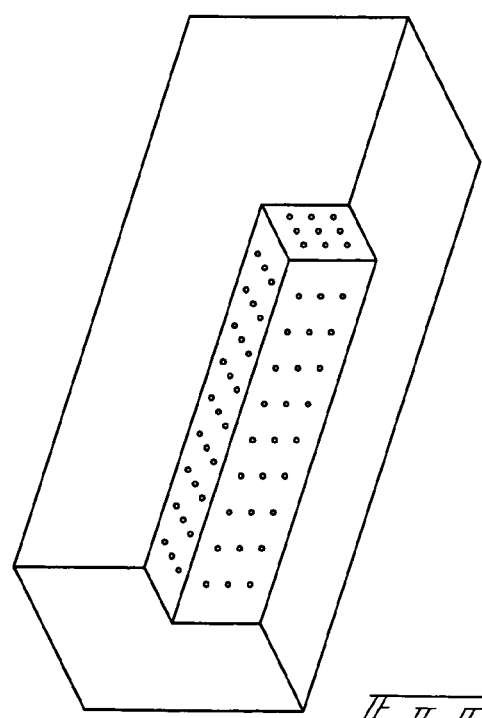
Fig. 11C

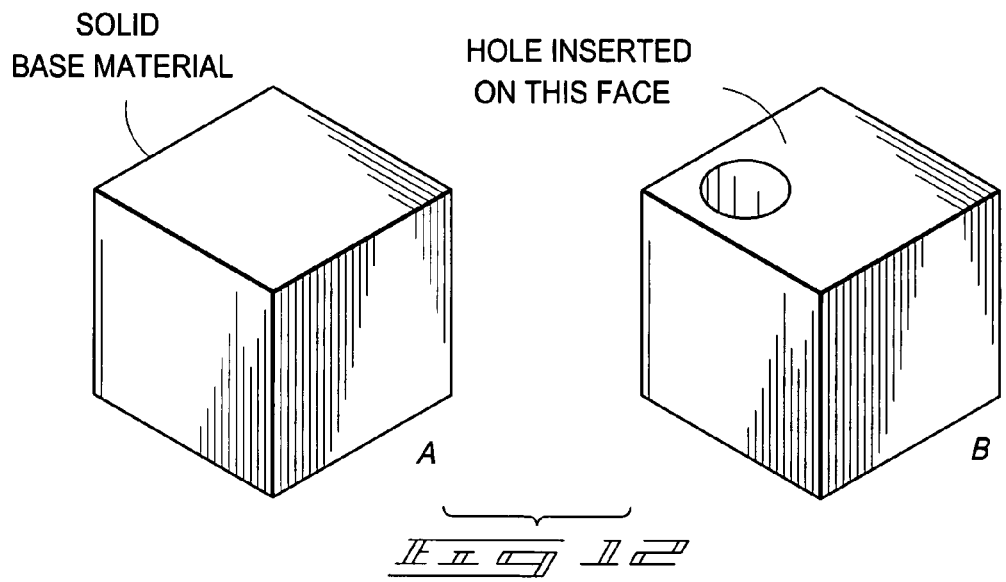
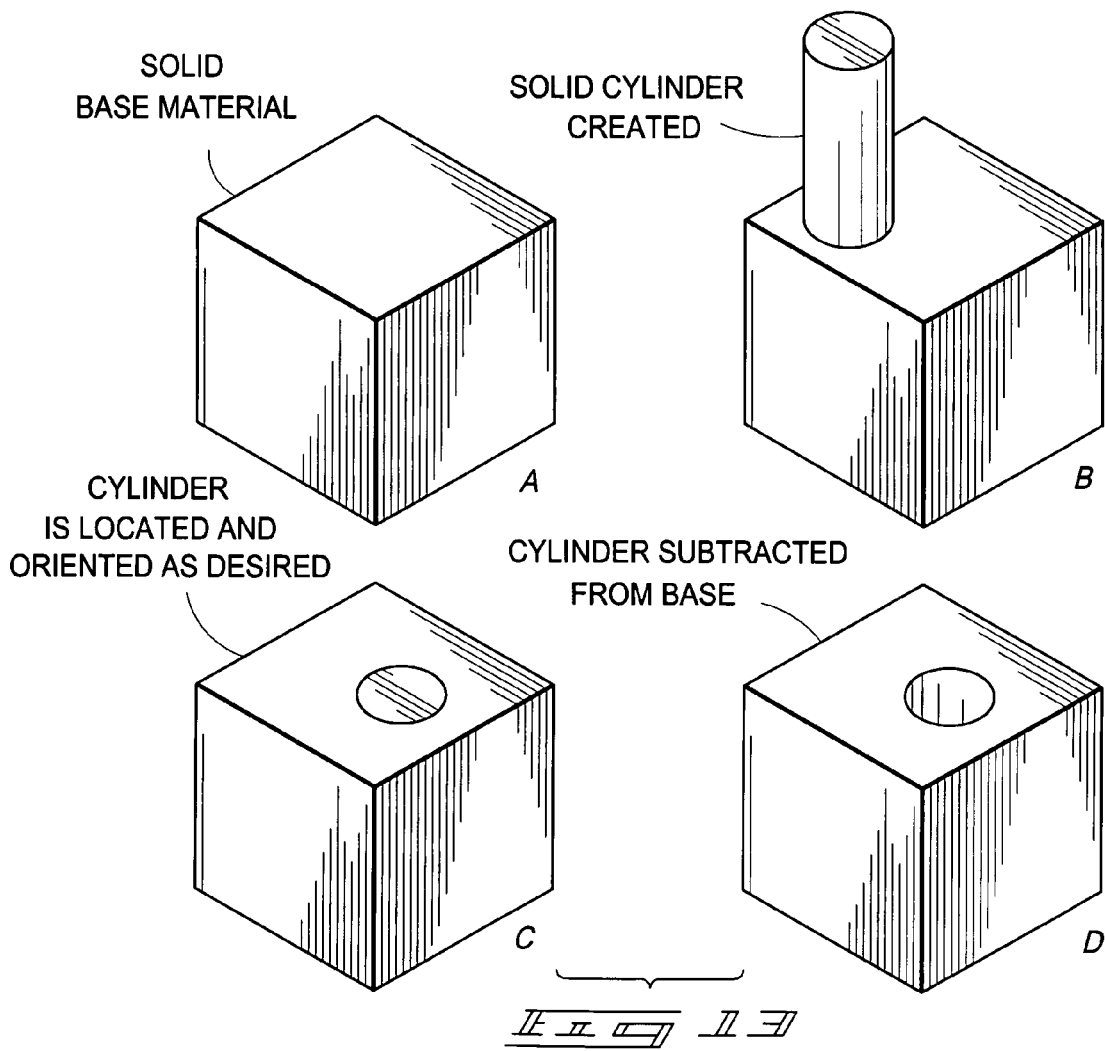

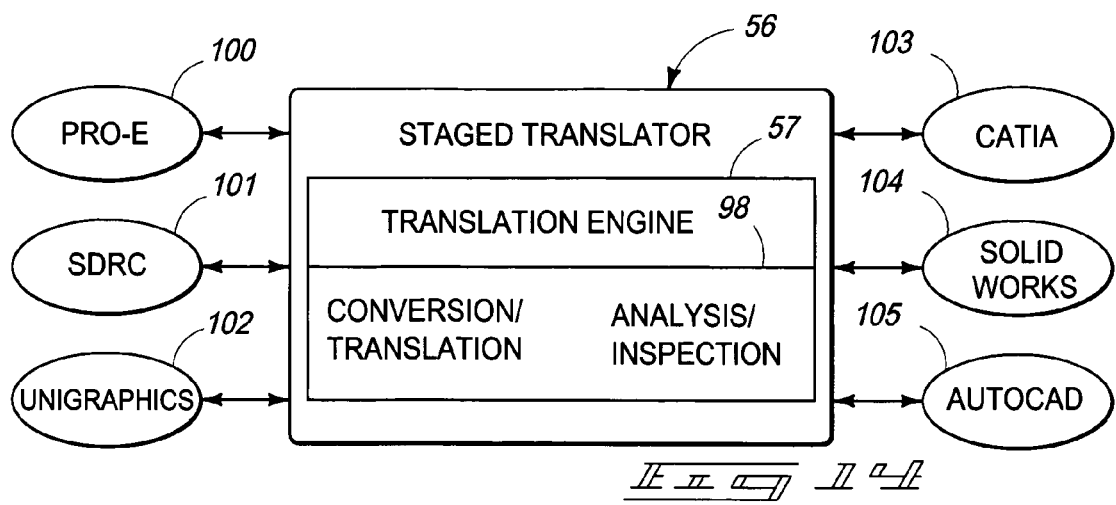
FIG. 14
FEATURE BASED TREE
$P_1$
$P_2$
$P_3$
$P_4$
$P_5$
$C_1$
$P_6$
$P_7$
$P_8$
$C_2$
FIG. 15
BOOLEAN BASED CSG TREE
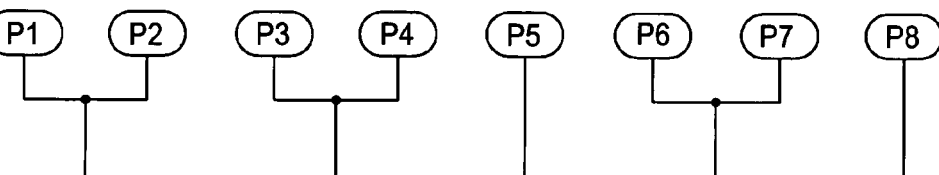
FIG. 16

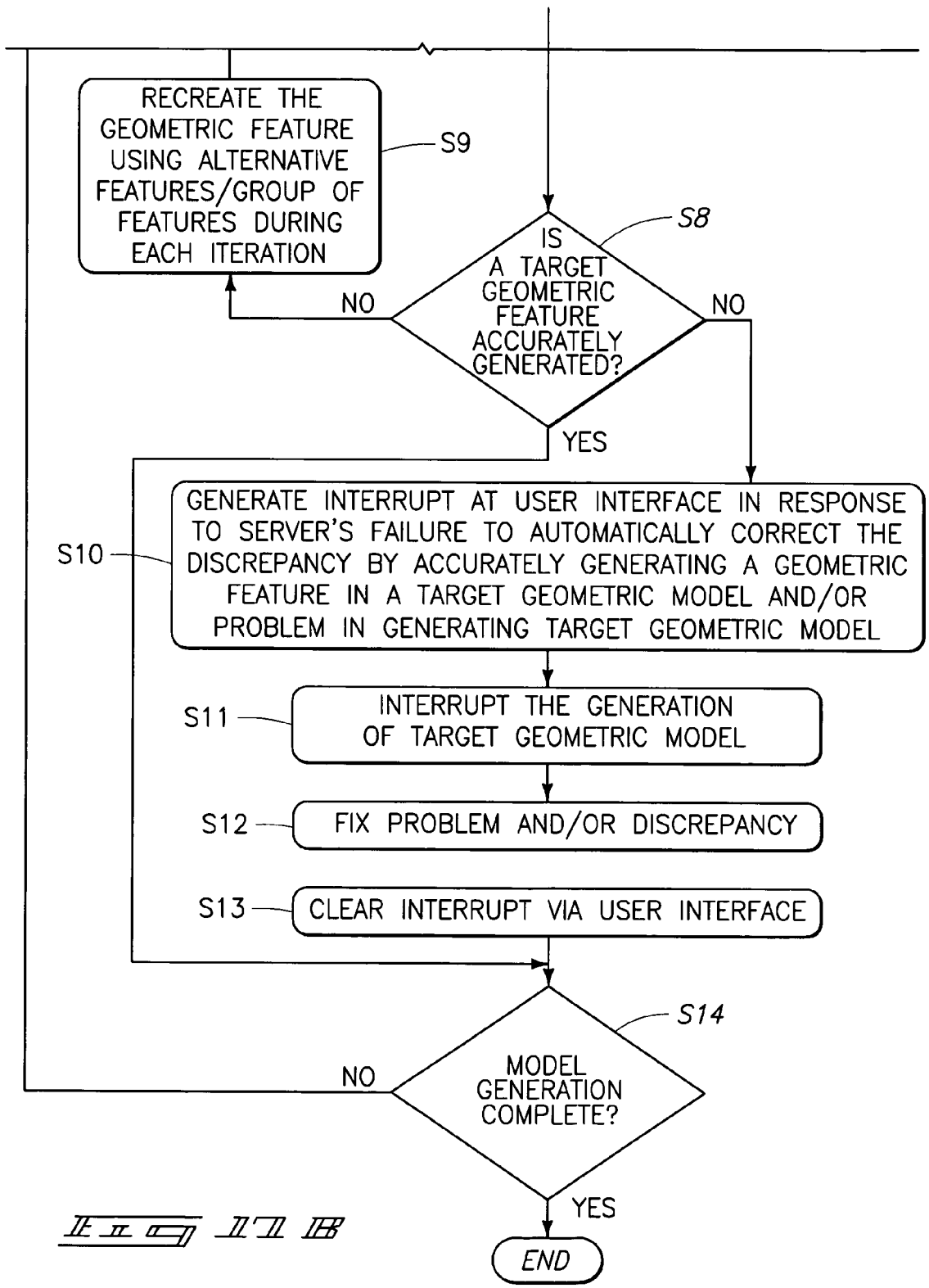

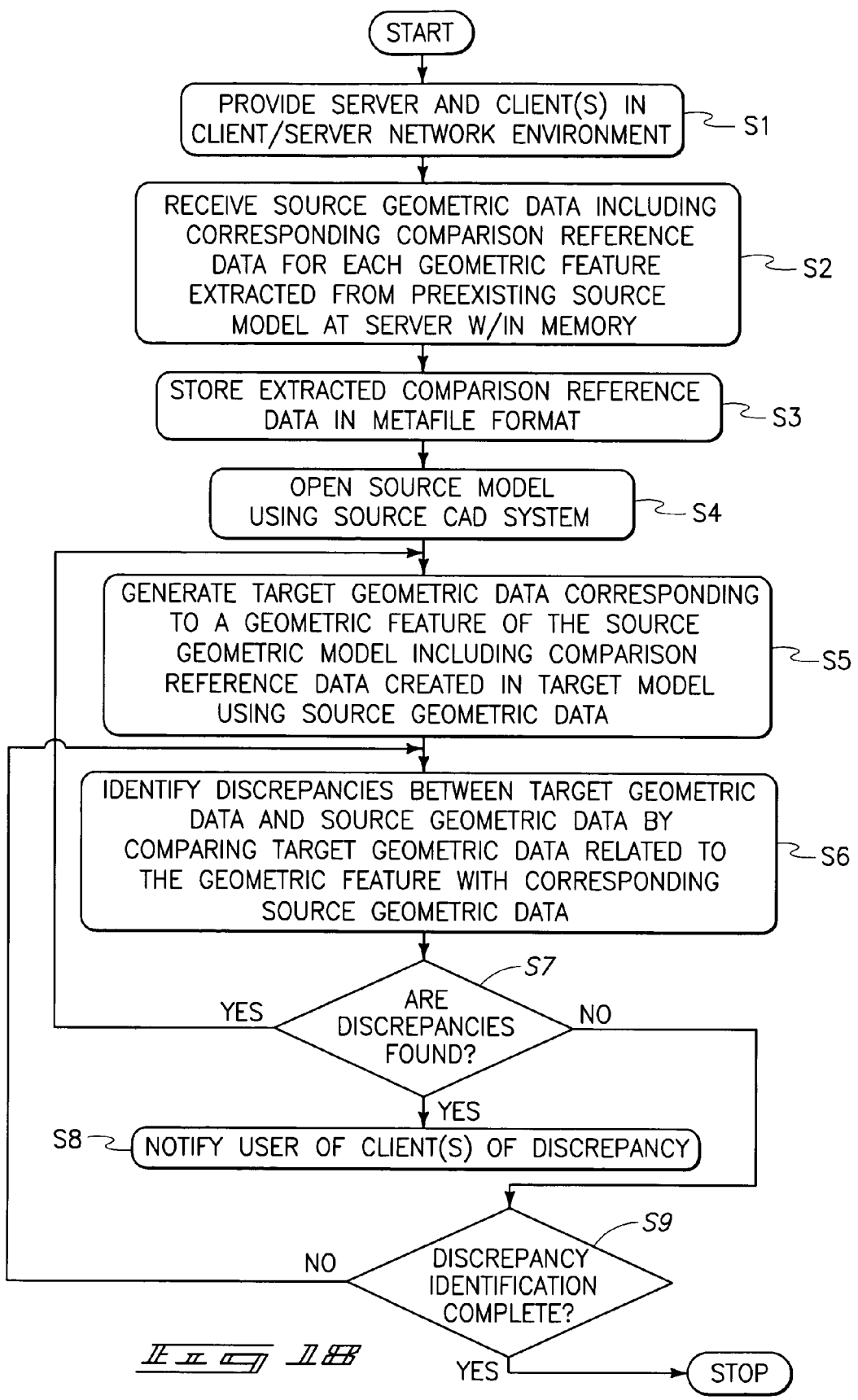

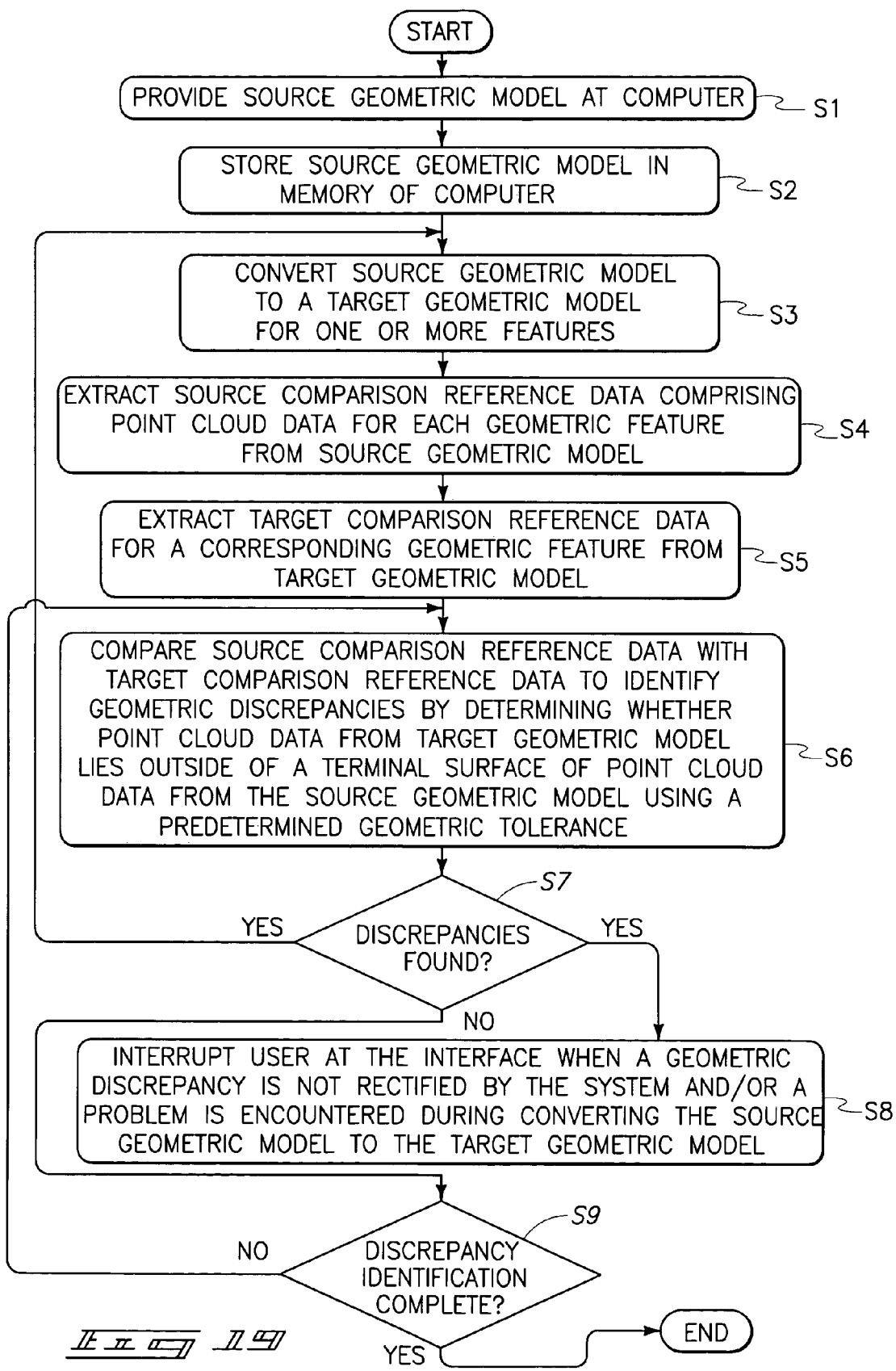

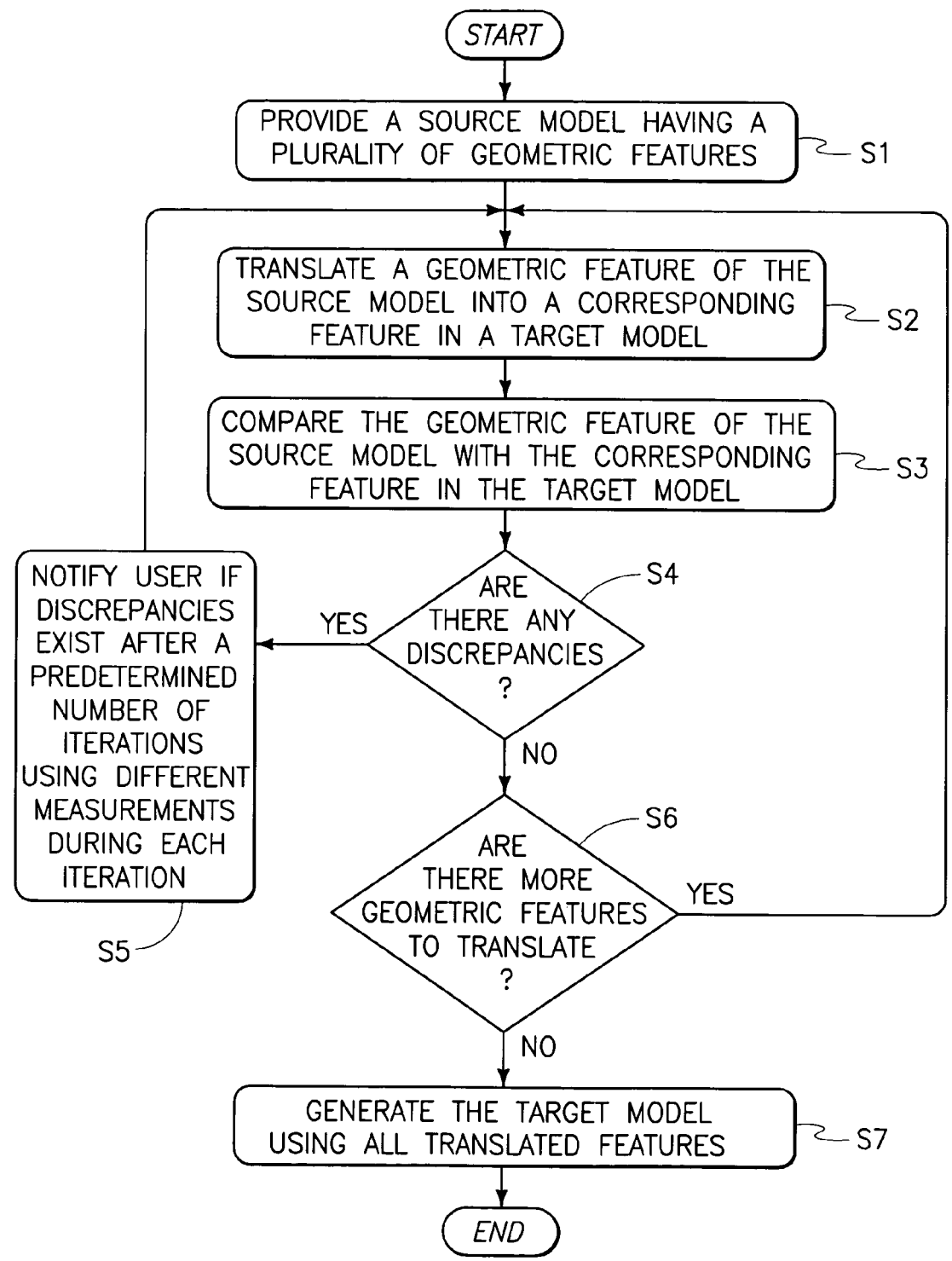

FEATURE-BASED TRANSLATION SYSTEM AND METHOD

RELATED PATENT DATA

This patent claims benefit of priority under 35 U.S.C. §119 to U.S. Provisional Patent Ser. No. 60/448,350, which was filed Feb. 18, 2003.

TECHNICAL FIELD

This invention generally relates to drawing and three-dimensional model conversion from one format to another. More particularly, it relates to a feature-based computer aided design file translation from a source format to a destination format including a serially progressive interrupt interface having a background operations manager, as well as computer aided design file translation including a geometric model comparator.

BACKGROUND OF THE INVENTION

Practically every product that results from the efforts of generic design or specialized design, such as architectural, electrical and mechanical design, involves the rendering of design drawings. In the last twenty years, nearly all of such drawings have been rendered using a computer aided design (CAD) system with a CAD software program. Typical CAD systems take the form of high-speed workstations or desktop computers that use CAD design software and input devices. These CAD systems generate output in the form of a printed design drawing or an electronic file format that can provide input to a computer aided manufacturing system (CAM).

Since the advent of computerized drawings, numerous computer aided design (CAD) programs have been developed. The translation of data files created by a first computer aided design (CAD) program into one or more data files readable by a second CAD program proves to be a difficult task. However, because of the relatively large number of diverse and competing CAD programs that are available, it is frequently the case that such translations need to be made. A number of underlying reasons exist for performing such translations, including execution of engineering projects that require the services of a main contractor using a first CAD program and a subcontractor using a second CAD program.

A presently existing technique for translating drawings involves the use of an IGES or STEP file. IGES and STEP are ANSI and ISO standards for exchange of data between CAD systems. Numerous CAD systems are provided with the capability to import and export the IGES and/or STEP file formats for CAD geometry interchange. The IGES and STEP file formats result in a generally fair translation accuracy where the files are not relatively complex. However, for typically involved applications, the IGES or STEP file format does not provide a complete solution for translating files.

In the currently existing approaches for performing file translation, at the end of the translation process, one would merely determine whether or not a feature was successfully created. None of the approaches determine whether or not each of the created features is geometrically accurate. Furthermore, attempts to rectify any discrepancies are conducted at the end of the entire translation process, thus adding complexity and delay to the translation process wherein discrepancies of a feature adversely affect creation of other interdependent features.

Accordingly, there exists a present need for a system and method that enables efficient and more effective translation of CAD files between at least two unique CAD file types, such as from a first CAD file type into a second CAD file type.

SUMMARY OF THE INVENTION

A feature-based translation system having a server including processing circuitry and an operation manager configured to compare source geometric data of each of a plurality of features in a source geometric model with target geometric data of respective features in a target geometric model, and operative to identify discrepancies in respective features therebetween. The server is configured to rectify discrepancies in a feature after generating the feature and prior to generating another feature among the plurality of features. The translation system further includes a communication link, at least one client communicating with the server over the communication link, and an interrupt interface provided by one of the at least one client and the server and operative to notify a user of the presence of an inability to automatically generate an accurate representation of a feature of the source geometric model in the target geometric model.

In one aspect, the present invention provides a system for generating a target geometric model from a source geometric model. The system includes a server having processing circuitry and an operation manager configured to compare source geometric data of each of a plurality of features in a source geometric model with target geometric data of respective features in a target geometric model. The server is configured to identify discrepancies in respective features between the features of the source and target geometric models. The server is further configured to rectify discrepancies in a feature after generating the feature and prior to generating another feature among the plurality of features. The system also includes a communication link, at least one client communicating with the server over the communication link, and an interrupt interface provided by one of the at least one client and the server and operative to notify a user of the server's inability to automatically generate an accurate representation of a feature of the source geometric model in the target geometric model.

Another aspect of the invention provides a system for translating a source file in a first format to a target file in a second format. The system includes a server configured to compare data of each of a plurality of features generated in a first format with target geometric data of respective features generated in a second format, the server operative to identify discrepancies in respective features therebetween. The server is further configured to automatically correct discrepancies of a feature generated in the second format prior to generating another feature. The system also includes at least one client communicating with the server over a communication link.

In yet another aspect, the present invention provides a computational geometry verification system having a client/server environment, a client having an interrupt interface, and a server communicating with the client via the environment and having processing circuitry and an operation manager configured to compare source geometric data related to each of a plurality of features in a source geometric model with target geometric data for corresponding features in a target geometric model, the server is configured to correct feature discrepancies after generating the feature and prior to generating another feature.

In a further aspect, the present invention provides a method of generating a target geometric model from a source geometric model. The method includes a) providing a server and a client of a computational geometry system having a user interface; b) extracting source geometric data for each of a plurality of features from the source geometric model file; c) using a target computer aided design (CAD) system, generating a target geometric model for each of the plurality of features having respective target geometric data; d) detecting at least (i) a discrepancy between a feature from the source geometric data and a corresponding feature from the target geometric data and/or (ii) a problem in generating the target geometric model; and e) iterating step c) using different measurements during each iteration in the event of a discrepancy between a feature from the source geometric data and a corresponding feature from the target geometric data in order to rectify the discrepancy. The method also includes generating an interrupt at the user interface if the discrepancy is not rectified after performing a predetermined number of iterations to generate the feature.

One advantage of the present invention is to provide a novel method and apparatus for computer aided design file translation having an interrupt interface for CAD model (or file) comparison which determines if each feature of a translated CAD model (or file) (the output, created by the translation) is geometrically identical to the corresponding original source CAD model feature (or file) from which it was translated. Each feature created in the target model is compared to a corresponding feature from the source model, and any errors in the creation of that feature are identified and corrected, thus preventing errors of a feature from being propagated through the rest of the target model.

Another advantage of the present invention is to provide a method and apparatus for computer aided design file translation including a geometric analyzer for CAD file comparison that uses point cloud extraction, including tessellated, surface and edge points.

A still further advantage of the present invention is to provide a method and apparatus for computer aided design model (or file) translation including a geometric analyzer for CAD file comparison that uses a stand-alone point cloud analyzer to increase the speed of the analysis.

A still further advantage of the present invention is to invoke the point cloud analysis method after first comparing geometric mathematical properties (volume, surface area, moments of inertia, center of mass) and detecting potential discrepancies. This allows the staging of the various complexities of the analyses methods.

BRIEF DESCRIPTION OF THE DRAWINGS

Preferred embodiments of the invention are described below with reference to the following accompanying drawings.

FIGS. 7 through 11C show various exemplary illustrations in order to more clearly explain the inventive concept;

FIGS. 12A-12B are simplified schematic diagrams illustrating the creation of a hole in a solid cube of material utilizing Pro/E;

FIGS. 13A-13D are simplified schematic diagrams illustrating the creation of a hole in a solid cube of material utilizing CATIA;

FIG. 14 is a block diagram illustrating the functional relationship of a staged translator having a translation engine for comparing source geometric data in a source geometric model of a first type with target geometric data of a target geometric model of a second type;

FIG. 15 illustrates mapping of a regeneration process when reordering a Boolean tree;

FIG. 16 illustrates an exemplary Boolean-based CSG tree;

FIGS. 17A and 17B show a process flow diagram showing the logic processing for performing file translation analysis including interrupt notification via a serial interrupt interface to a user using a user interrupt interface;

FIG. 18 is a process flow diagram showing the logic processing for managing computational geometry translations by way of the geometric model comparator;

FIG. 19 is a process flow diagram showing the logic processing for implementing a geometric file conversion on a computer system having an interface; and FIG. 20 is a high-level process flow diagram illustrating the concept shown in FIG. 19.

DETAILED DESCRIPTION OF EXEMPLARY EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. One exemplary implementation is described below and depicted with reference to the drawings comprising a system and method for identifying geometric discrepancies between input data and output data of a plurality of features of a source model and respective features in a target model. While the invention is described by way of a preferred embodiment, it is understood that the description is not intended to limit the invention to this embodiment, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art. Furthermore, U.S. Provisional Patent Application Ser. No. 60/243,848, filed Oct. 30, 2000, PCT Application PCT/US01/45501, filed on Oct. 30, 2001; U.S. patent application Ser. No. 09/999,096, filed on Oct. 30, 2002; and U.S. patent application Ser. No. 09/999,097, filed on Oct. 30, 2002, and their disclosures are all incorporated by reference herein in their entirety.

Figure 1:
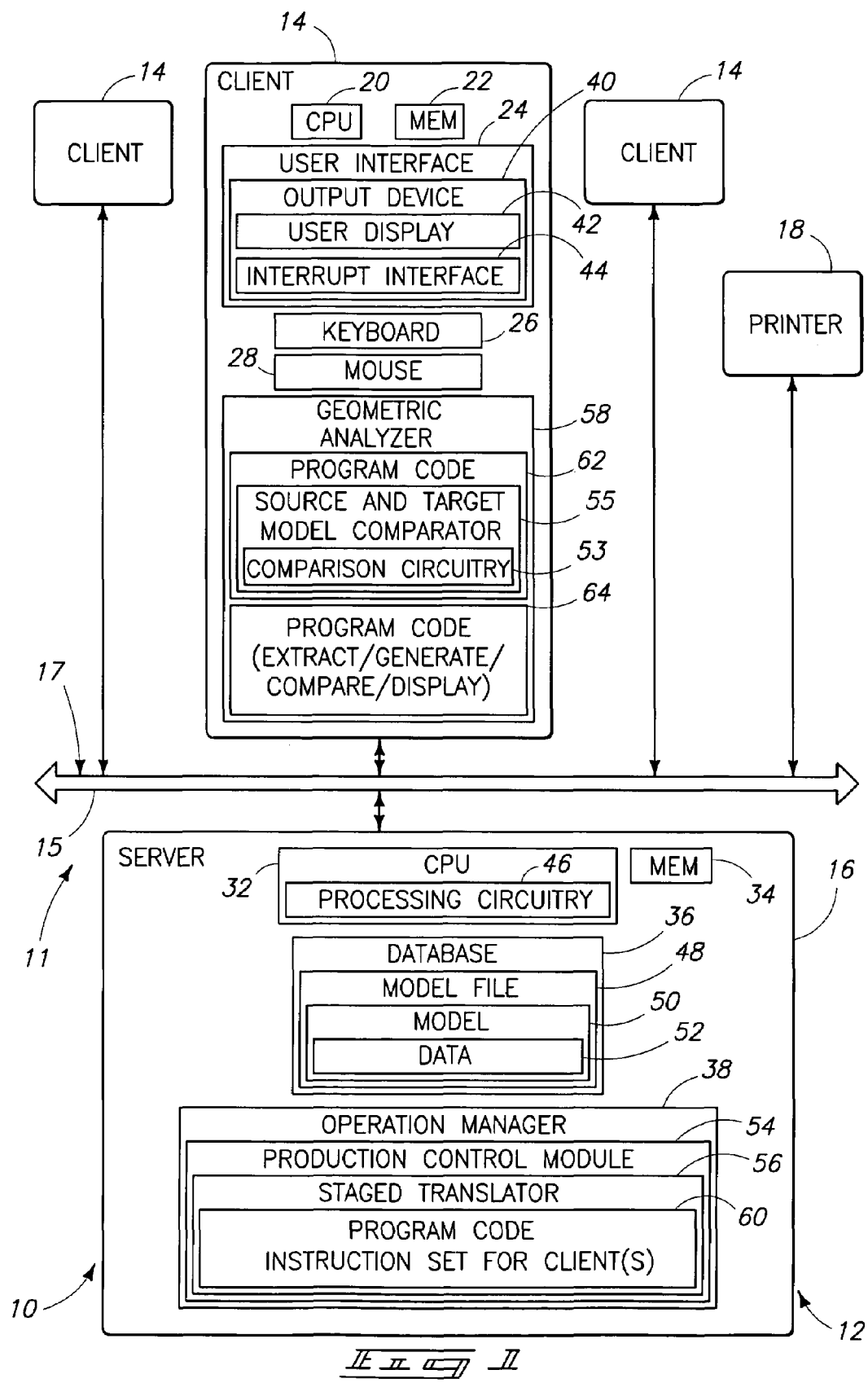
FIG. 1 is a block diagram overview of a basic system configuration of an exemplary system for implementing computer aided design file translation according to one embodiment of the present invention.

FIG. 1 illustrates a preferred embodiment of Applicant's invention wherein a basic system configuration is provided for comparing input data with output data, identifying geometric discrepancies between the input data and the output data using a geometric model comparator such as for example, a Mirror Model Comparator (MMC), iterating the step of generating a feature in the event of identifying a discrepancy in the representation of the feature of the source geometric model in the target geometric model. The system interrupts an operator when there is an inability to automatically generate an accurate representation of the feature of the source geometric model in the target geometric model. Geometric model comparator 10 is provided by a computer aided design (CAD) file translation system 12. In one form, system 12 is implemented in a distributed manner across a local area network (LAN) 11, such as a client/server network 13, within a LAN environment. However, it is understood that system 12 can also be implemented on a single, stand-alone workstation, such as on a central personal computer.

As shown in FIG. 1, system 12 is implemented across a client/server network 13 having a plurality of clients 14 connected via a communication link 15 with a server 16. In one form, communication link 15 comprises a local area network (LAN) connection 17. According to alternative constructions, a plurality of servers similar to server 16 are included within LAN 11. Further alternatively, server 16 and client 14 can be provided by the same device for the case of a stand-alone workstation. Optionally, for the case of a distributed client/server network implementation server 16 can include a client, similar to client 14. Even furthermore, system 12 can include a single client 14, according to an alternative construction. System 12 also includes a printer 18 provided within LAN 11.

As shown in FIG. 1, client 14 in one construction comprises a client computer having a central processing unit (CPU) 20, memory 22, a user interface 24, a keyboard 26, a mouse 28, a geometric analyzer 58, and specialized program code 64 that cooperates with server 16 to extract, generate, compare, iterate, and display. Although not shown in FIG. 1 in order to simplify the drawings, it is understood that all of clients 14 are similarly constructed.

For purposes of this disclosure, the term "client" is understood to include a computer or a workstation, such as a personal computer provided within a client/server environment. A "client" is also intended to include any device present within an environment, such as a LAN environment provided by LAN 11, that includes an interface 24 for enabling a user to interact with client 14 and server 16 such that a user can be notified of important events via an interrupt interface 44. Even furthermore, "client" is intended to encompass the case of a stand-alone workstation, a computer, or a workstation that includes a server similar to server 16. It is further understood that a "client" can include other software components such as a database 36 and an operation manager 38, when constructed as a stand-alone workstation.

Also for purposes of this disclosure, the term "server" is understood to include one or more computers that are located at one or more physical locations within an environment, such as a LAN environment. Furthermore, for purposes of this disclosure, the term "server" is understood to include computers located at one or more physical locations, such as computers distributed about a network or a stand-alone workstation.

More particularly, server 16 includes a central processing unit (CPU) 32, memory 34, database 36, and operation manager 38. Within server 16, CPU 32 includes processing circuitry 46 that communicates with memory 34 in processing data 52 within a database 36 as well as handling program code 60 within operation manager 38. Database 36 includes one or more model files 48 for storing models 50 comprising data 52. Operation manager 38 comprises a production control module 54 including a staged translator 56 in which program code 60 is provided for forwarding one or more instruction sets to clients 14 to cause program code 64 to extract, generate, compare, iterate, and/or display CAD models (or files).

With respect to client 14, user interface 24 includes an output device 40 which, in one form, comprises a user display 42 and interrupt interface 44. Geometric analyzer 58 includes program code 62, as described below in greater detail.

In order to implement computer aided design (CAD) file translation, geometric model comparator 10 utilizes geometric analyzer 58 to compare CAD files using point cloud extraction, as discussed below in greater detail. CAD file translation system 12 converts a first CAD file that is associated with a feature of a first CAD program into a second CAD file associated with a respective feature in a second CAD program. Geometric analyzer 58 then determines if a translated CAD feature file is "geometrically identical" to the original source CAD feature file from which it was translated. For purposes of this disclosure, the term "geometrically identical" is understood to mean geometrically substantially the same, within an acceptable predetermined geometric tolerance. In operation, geometric analyzer 58 implements point cloud analysis, including the identification and analysis of tessellated point cloud types, surface point cloud types, and edge point cloud types, as discussed below in greater detail. The geometric analyzer 58 superimposes the points from a surface and edge data onto the target model and measures the distance between each point and its respective surface or edge. Any distance that is greater than a pre-specified analysis tolerance is deemed an error and is presented as such in an analysis report. Additionally, the geometric analyzer 58 leaves each point representing the error in the target model, so that an operator may investigate the nature and magnitude of the error in addition to performing any corrective actions.

More particularly, geometric analyzer 58 determines if each of a plurality of features of a translated, target CAD model (or file) is geometrically identical to respective features of an original, source CAD model (or file). In order to make this determination, geometric analyzer 58 implements a comparison of surface and boundary edges for each respective feature file. Subsequently, a reverse point cloud analysis is then performed utilizing points that are extracted from the target (or output) file, which is then compared to the source (or input) file.

In summary, the implementation of point cloud extraction entails point cloud analysis which uses points that have been extracted from the source CAD model file. As will be discussed below in greater detail with reference to FIG. 4, these points lie either on the surfaces of an individual geometric feature, or they lie on one of the boundary edge curves. These extracted points are then recreated in the target CAD model file, after which distances between the points and the adjacent surfaces and edges are measured. Geometric analyzer 58 then implements point cloud analysis, following implementation of the point cloud extraction, in order to compare the surface and boundary edges of each respective file. It is understood that point cloud analysis of geometric analyzer 58 can be run as a stand-alone apparatus. Alternatively, point cloud analysis can be run as a CAD application that is implemented in accordance with proprietary software and an appropriate software license obtained from a respective CAD application developer.

For the case where a system 12 is implemented as a stand-alone apparatus or workstation, system 12 is not required to use proprietary CAD programs for performing analysis (as sold commercially). Therefore, such a stand-alone apparatus does not require the use of dedicated CAD workstations with proprietary CAD programs that incur relatively expensive royalties for using such proprietary CAD programs in order to perform analysis. Such a stand-alone CAD workstation has the capability to check points more rapidly because of the ability to optimize such a workstation for a specific purpose. In performing point cloud analysis for each of a plurality of features of the source CAD file, the distance between each point and an associated surface or edge for a respective feature is measured. Such measured distances for the respective feature are recognized as being acceptable when they fall within a relatively small (or minimal) threshold value. Otherwise, the generation of the respective feature (or a geometrically equivalent feature) is iterated for a predetermined number of times to accurately represent the respective feature. In the event of the system's failure to accurately generate the respective feature in the output (or target) after a predetermined number of iterations, a user at interrupt interface 44 is notified of such a discrepancy.

In operation, geometric analyzer 58 of client 14 is configured to determine if translated target geometric model files for each of a plurality of features are geometrically identical to respective files of an original source geometric model from which they were translated. In one case, source and target geometric model files for each of the plurality of features each comprise respective CAD files. Geometric analyzer 58 is used to inspect such CAD files by measuring the surfaces and boundary edges on all geometric features present in one CAD file, and then compare the respective surfaces and boundary edges to the corresponding surfaces and boundary edges in the other respective file. For example, for each of the features, the measured surfaces and boundary edges from a source geometric model file are compared with the measured surfaces and boundary edges of the respective target geometric model file.

More particularly, in one case geometric analyzer 58 performs a forward inspection by comparing surfaces and boundary edges of a feature in a source geometric model file with surfaces and boundary edges of the respective feature in a target geometric model file. Alternatively or additionally, a reverse inspection is performed by geometric analyzer 58 wherein surfaces and boundary edges of a feature of a target geometric model file are compared with surfaces and boundary edges of the respective feature of a source geometric model file.

Server 16 of FIG. 1 includes database 36 which is configured to store input data of a source model. Processing circuitry 46 is configured to convert the input data of the source model into corresponding output data of the target model. Geometric analyzer 58 includes a source and target model comparator that is configured to compare each of a plurality of features of the input data with the corresponding output data to identify geometric discrepancies between the input data and the output data.

Geometric analyzer 58 enables measurement of such surfaces and boundary edges, iterates generation of a respective feature in the event of inaccurate representation of the feature in a target model, and then, in the event of the geometric analyzer's inability to automatically and accurately represent a feature in the target model, the geometric analyzer 58 facilitates the reporting of measured and compared results to an operator at a user interface 24 of client 14. Geometric analyzer 58 implements point cloud analysis in order to perform measurements between the surfaces and boundary edge curves of the source model and the target model. More particularly, geometric analyzer 58 uses points that were previously extracted from the source model file. Such points either lie on the surfaces of the individual geometric features of a model, or such points lie on one of the boundary edge curves of the model. The respective points are then recreated in the target model file, after which distance is measured between each point and respective adjacent surfaces and edges.

In order to increase the probability that the existence of any differences between the source model files and the target model files will be detected, the above process is also implemented in reverse. Accordingly, geometric analyzer 58 extracts points from the target model file, then recreates the points in the source model file. Afterwards, geometric analyzer 58 measures distances between the points and their appropriate surface or boundary edge curve of the target model file and the source model file. It will be appreciated that the above procedure is implemented for each of a plurality features of a source model file and the respective features that are created in a target model file.

It will also be appreciated that point cloud analysis can either be performed using a source CAD system and a target CAD system, or point cloud analysis can be performed using a stand-alone system, such as a workstation, that has been developed specifically as a stand-alone computational geometry system. Such a stand-alone implementation provides an advantage in that special purpose construction can make it relatively faster, thereby enabling a larger number of points to be analyzed within a given amount of time. Such result increases the probability of detecting geometric discrepancies.

Figure 2:
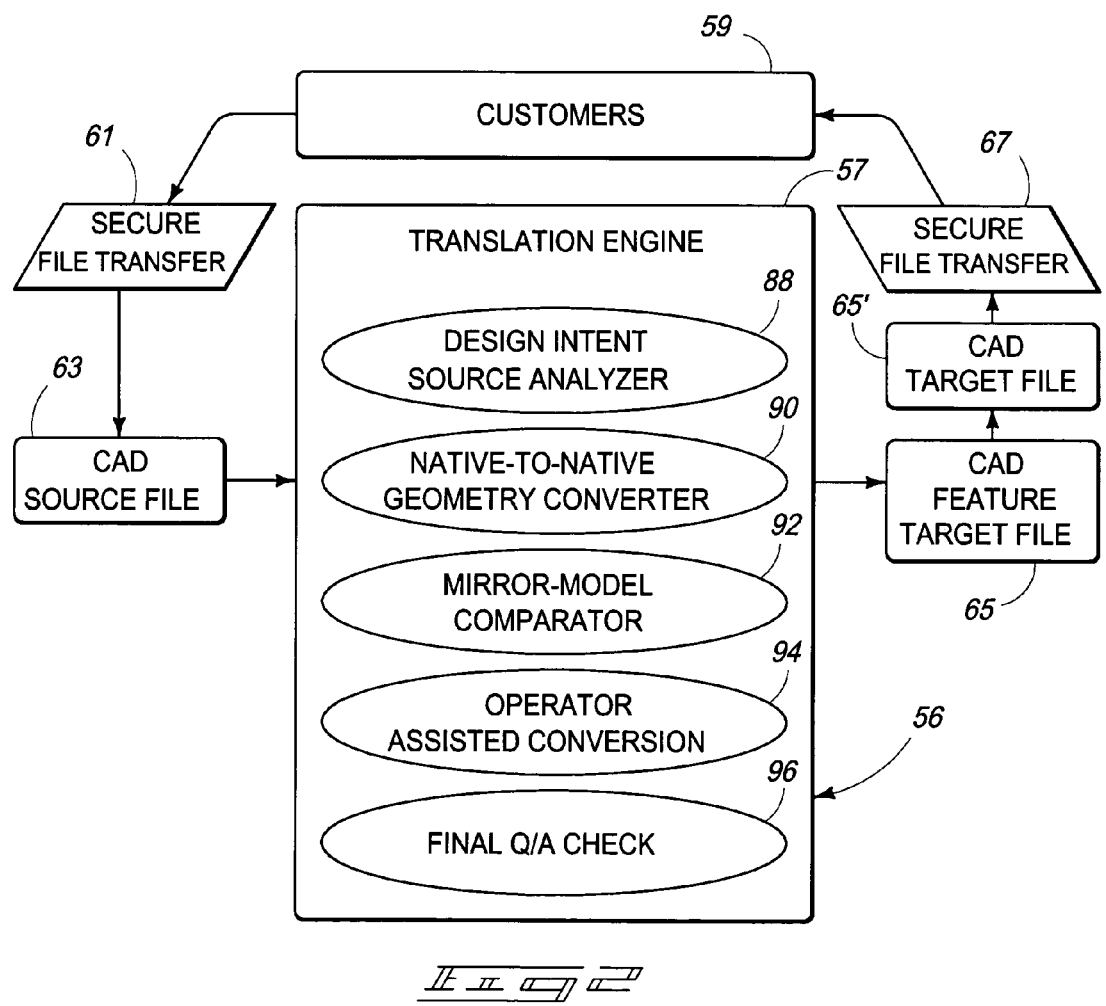
FIG. 2 is a block diagram of a representative geometric data comparison implementation performed via a translation engine of a feature based computational geometry system according to the present invention.

FIG. 2 illustrates the translation process between a source CAD file and a target CAD file utilizing the computer aided design file translation system of FIG. 1. More particularly, translation engine 57 of staged translator 56 (see FIG. 1) receives a source CAD feature file 63 by way of a secure file transfer 61 from a customer 59. Translation engine 57, by way of a process implemented for the computer aided design file translation system of the present invention, converts source CAD feature file 63 into a target CAD feature file 65. A target CAD file is created from a plurality of target CAD feature files. The target CAD file 65' is then transferred via a secure file transfer 67 back to customer 59. One technique for implementing the secure file transfer 61 and 67 entails utilizing secure file transfer over the Internet by uploading and downloading files securely over the Internet via one or more secure servers.

Upon uploading a source CAD file 63 to a translation provider's web site, a job description profile is preferably generated. File 63 is then passed to a pre-processing station, configured as a design intent source analyzer 88, which performs design intent analysis, and identifies any pre-processing tasks that are required in order to prepare the file for a translation production line.

Subsequent to processing, resulting file geometry data of each feature of a source CAD file is then converted into a target CAD file format utilizing native-to-native geometry converter 90. After such conversion, each feature of the target CAD model file is compared to the respective feature of the source CAD model file using a mirror-model (or geometric model) comparator 92. Any discrepancies found as a result of source-target feature file comparison are then attempted to be automatically corrected by iterating the process of generating a target feature (or a geometrically equivalent feature or a geometrically equivalent group of features) of a corresponding source model feature. If unsuccessful, then such a discrepancy is conveyed to a human translator in the form of a text report and a visual display that is provided in the target CAD model. The target CAD file is then modified via an operator-assisted conversion process 94 in order to eliminate any discrepancies. The file is then re-compared to the source CAD model as a final quality assurance (QA) 96, and is then sent back to the customer via the Internet.

Figure 3:
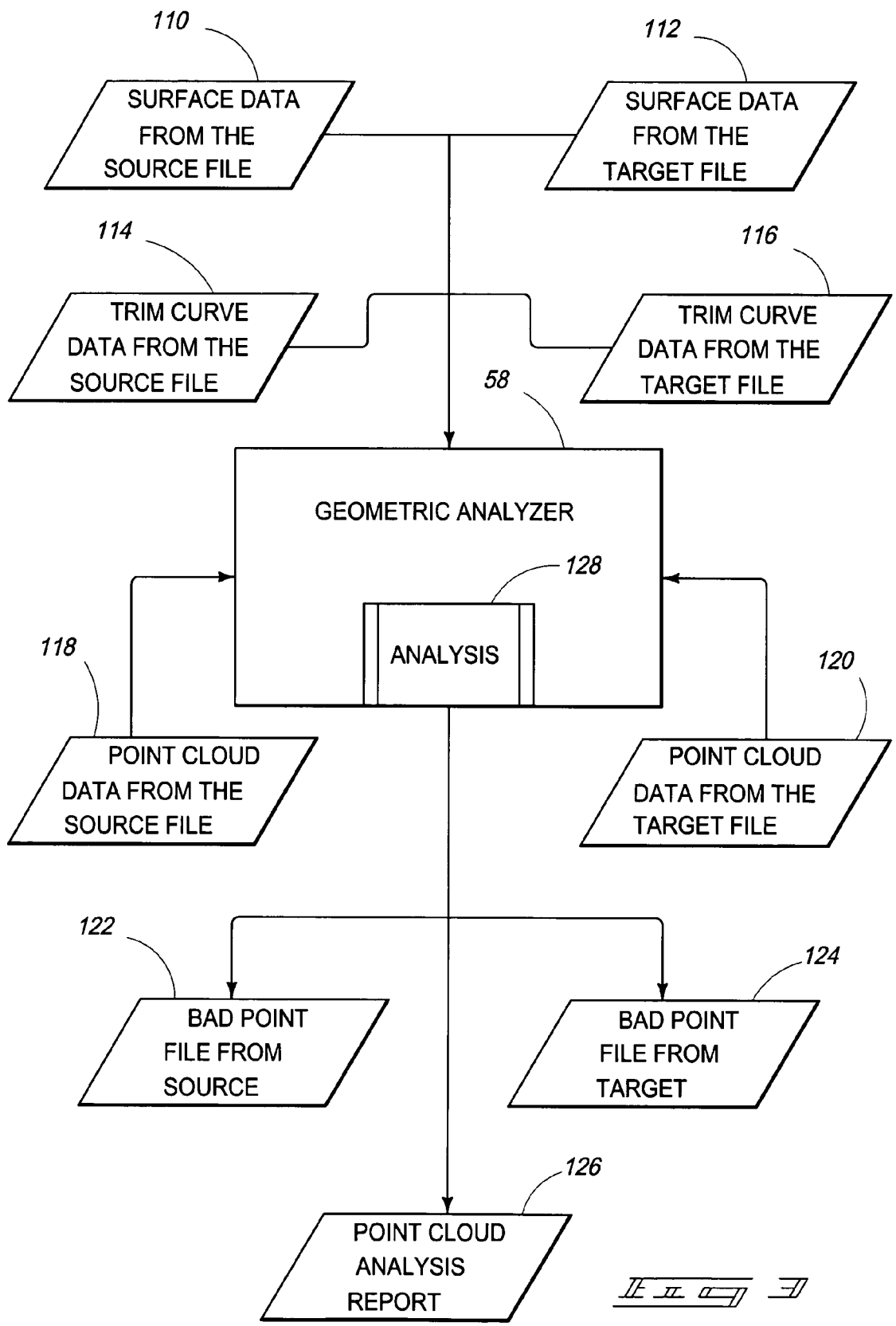
FIG. 3 illustrates data input to a geometric analyzer and respective output in the form of files from the geometric analyzer for a stand-alone workstation embodiment.

As shown in FIG. 3, all of the surfaces and associated trim curves for each of a plurality of features are required to be extracted from both the source CAD model file and the target CAD model file, after which the extracted associated trim curves are stored in geometric analyzer 58 (of FIG. 1). More particularly, for each feature, surface data 110 from the source file and surface data 112 from the target file, along with trim curve 114 from the source file and trim curve data 116 from the target file, are input into geometric analyzer 58. For each feature, Source point cloud data 118 is then analyzed against target surface/trim curve data 110, 114, and target point cloud data 120 is analyzed against source surface/trim data 112, 116, as shown in FIG. 3. Bad point cloud files 122, 124 are then imported into respective CAD model files and the process of generating the feature is iterated a predetermined number of times until the feature is accurately generated within the range of an acceptable tolerance margin. In the event of a failure to accurately generate the feature, the bad point cloud files 122, 124 are displayed to an operator or user, typically via interrupt interface 44 of client 14 (of FIG. 1). Utilizing the CAD software's internal geometry analysis tools, an operator can measure the distance from each individual point, of a feature, to an associated edge or curve in order to ascertain the magnitude and cause of a deviation. Furthermore, an analysis algorithm 128 of geometric analyzer 58 generates a point cloud analysis report 126.

In order to implement point cloud extraction, geometric analyzer 58 (of FIGS. 1 and 3) performs three different types of point cloud analysis: tessellated point cloud analysis; surface point cloud analysis; and edge point cloud analysis. A description of each of these different types of point cloud analysis is described below with reference to FIGS. 4-7.

Operation manager 38 includes a native-to-native geometry conversion system within program code 60. When such system translates a CAD model file, each geometric feature is scrutinized using translator software within staged translator 56; namely, via program code 60. The translator software is operative to extract point cloud data by forwarding an instruction set to clients 14 that cooperates with program code 64 for directing extraction of point cloud data. In order to assure that points for each geometric feature are extracted accurately, the distance between points and their corresponding associative entities (surfaces and curves) in the source model file are measured using extraction software within program code 64. For each geometric feature, all points that do not lie directly on a surface or an edge curve are then deleted. This step is necessary in order to protect against algorithmic errors that are potentially present in CAD system software. Remaining points are then stored in a file which is labeled according to type: tessellated; surface; or edge. In a similar manner, when a file translation has been completed, point cloud data for each geometric feature is extracted from the target file and is then stored in memory 22.

System 12 implements point cloud analysis by way of geometric analyzer 58. When a user or operator of client 14 runs geometric analyzer 58, appropriate point cloud files for each geometric feature are read by geometric analyzer 58. Such implementation occurs whether system 12 is implemented across a client server network environment or via a stand-alone workstation. The points are then compared against their corresponding entities by measuring the distance between each respective point and the nearest edge or surface that is present in the other CAD file. Points which have been extracted from the source are then measured in the target file, and points extracted from the target are measured in the source file. Surface points are then measured distance-wise against surfaces, and edge points are measured against edge curves.

For each geometric feature, if it is found that the distance between each individual point and its associated entity is less than a specific predetermined tolerance value that is required for a geometric feature, then the point is deleted from the model file. For example, the distance between a point and an edge curve in a source file is compared with the distance between the respective point and the respective edge curve in a target file. If the difference between such measured values deviates more than a specific predetermined tolerance value based upon a unit of measure), then the point is not deleted from the model file because it is found to be outside the tolerance range.

When geometric analyzer 58 has measured all of the points in the point cloud file(s), the points that are left over in the model file, for each geometric feature, are points that do not lie directly on (or within a tolerance range) of any surface or edge. Such points represent differences in the feature geometry between the two files. The coordinates of these points are then saved in a separate file that is appropriately labeled "Bad Point File". Where a forward check is performed, a bad point file is created from the source. Where a reverse check is performed, a bad point file is created from the target. The distance from this point to the associated curve or surface comprises the magnitude of the deviation in geometry at that specific point in space. Upon determining the differences in the feature geometry between the source and target files, the process of generating the geometric feature is iterated a pre-specified number of times by the geometric analyzer in order to accurately represent the geometric feature in the target file.

Figure 4:
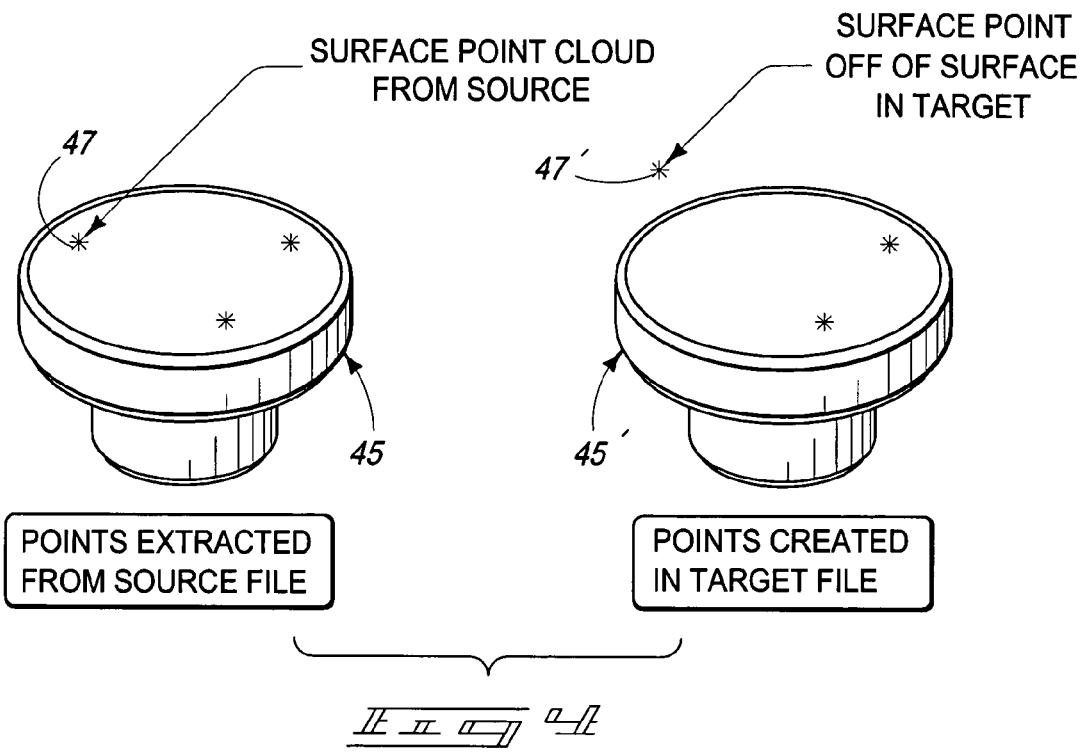
FIG. 4 is a perspective view illustrating extraction of point cloud data from a source model which is recreated in a target model wherein distances between respective points and a corresponding surface are measured.

FIG. 4 illustrates point cloud data that is extracted from a source model 45 and recreated in a target model 45'. The distance between respective points 47 and 47' on the corresponding surface is then measured. The resulting deviation from point 47 to the associated curve or surface (of source model 45 and target model 45') is the magnitude of the deviation geometry at that specific point in space.

Geometric analyzer 58 also identifies different point cloud types. Each of the three previously identified types of point cloud data is extracted separately utilizing a CAD file translation engine provided by staged translator 56; namely, via program code 60 which sends instructions to clients 14. Each type of point cloud data is described below in greater detail. Geometric analyzer 58 uses each point cloud type in order to maximize the advantages of each, while minimizing relative disadvantages. Geometric analyzer 58 uses a tessellated point cloud type in order to quickly find missing features and gross differences in relative geometry. Surface point cloud types are used to accurately determine differences between surfaces, as well as to verify the dimensional integrity of features. Edge point cloud types are used to verify boundary accuracy and can provide detailed correction information to an operator.

TABLE 1

A Comparison of Point cloud Types

| Type | Advantages | Disadvantages |
| --- | --- | --- |
| Tessellated | Automatically increases point density for areas of high curvature Quickly finds missing features Quickly finds gross geometry errors/differences | May detect differences on boundary edges Difficult to create correcting geometry from these points (need edge points to build boundaries) Can miss subtle geometry errors/differences |
| Surface | Very accurate for surface error detection | May not detect differences on boundary edges Difficult to create |

TABLE 1-continued

A Comparison of Point cloud Types

| Type | Advantages | Disadvantages |
|------|------------|---------------|
| Edge | Quickest analysis to perform<br>Detects surface differences between the boundary curves<br>Detects boundary curve differences<br>Facilitates correction geometry creation (especially if used with surface Point cloud) | correcting geometry from these points (need edge points to build boundaries)<br>Longer analysis time<br>Does not detect differences on surfaces between the edge curves |

Tessellated Point Cloud

Further details regarding Tessellated Point Cloud, Surface Point Cloud, and Edge Point Cloud are described in PCT Application PCT/US01/45501 filed on Oct. 30, 2001, the disclosure of which is incorporated herein by reference in its entirety.

Point Cloud Analysis

Once all the point cloud data has been generated with geometric analyzer 58 using the above-described techniques, three-dimensional coordinates for the resulting point cloud data are stored in files along with their respective feature parameter data. By using presently available programming interface functions of each respective CAD software, these points are created in an appropriate CAD model file. For example, API functions are available for use. The tessellated and surface point clouds are then analyzed by measuring the distance from each individual point to the nearest surface. Edge point clouds are measured to the nearest edge curve. If the resulting distance is equal to zero, or is smaller than a tolerance that has been previously specified in geometric analyzer 58, then the point is deleted from the model. Any points remaining in the model file after analysis is complete are then classified as geometry errors and their coordinates are stored in a separate geometry error file such as bad point files 122 and 124 of FIG. 3, and the process of generating the geometric feature from which the bad point files are generated is repeated in order to accurately represent the geometric feature. A user is notified in the event of the geometric analyzer's failure to accurately represent the feature even after a predetermined number of iterations.

Because the most common type of surface encountered is a surface that is bounded by three or more edges, the number of edge points and the number of edges in a model can quickly become very large. In order to determine which edge provides a nearest edge, geometric analyzer 58 is required to measure the distance from each edge point to each edge within a given model. In models having relatively large numbers of surfaces, edges and points, this analysis can be relatively intensive and time consuming.

Accordingly, in order to speed up edge analysis, the number of edges required to be analyzed against a given point is reduced by measuring only to those edges in which a pre-sized bounding box contains the point being analyzed. More particularly, a bounding box is provided having a dimensional tolerance value in which the bounding box is the smallest three-dimensional box that can contain the entire edge curve. The above techniques greatly reduce the number of times that the analyzer is required to measure the distance from a given point to a given edge within a model.

Point Cloud Analysis (Stand-Alone Analyzer)

According to an alternative construction where system 12 is implemented within a stand-alone workstation, system modifications are made in order to speed up analysis. In the past, the use of a CAD system's internal tools to measure distances from points to curves and surfaces has typically been a relatively slow process. A slow process results because the analysis tends to be subject to the speed limitations of the CAD software itself. The CAD software is typically busy doing several other operations; for example, one operation entails displaying a complex image to an operator. Accordingly, relatively slow operating speed can result from speed limitations and other operations.

For the case of a stand-alone workstation version of system 12 (and geometric analyzer 58), increases in speed of analysis are implemented by modifying the implementation procedure. Accordingly, point cloud densities can be increased, which in turn improves the accuracy of analysis.

The extraction of surfaces from the source CAD system and the target CAD system is done by extracting NURBS surfaces (as discussed below), and their associated trim curves.

Figure 5:
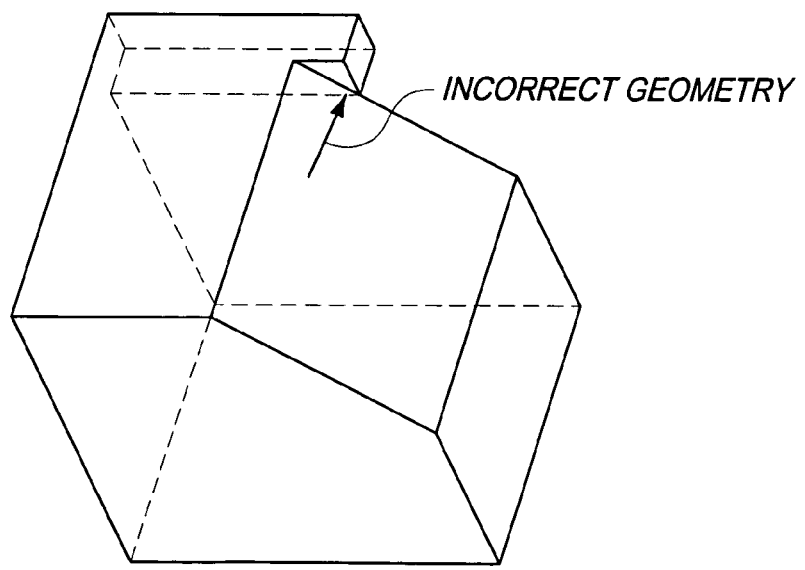
FIG. 5 illustrates an exemplary target geometric model created from a source geometric model, the target geometric model having an incorrect geometric feature.
Figure 6:
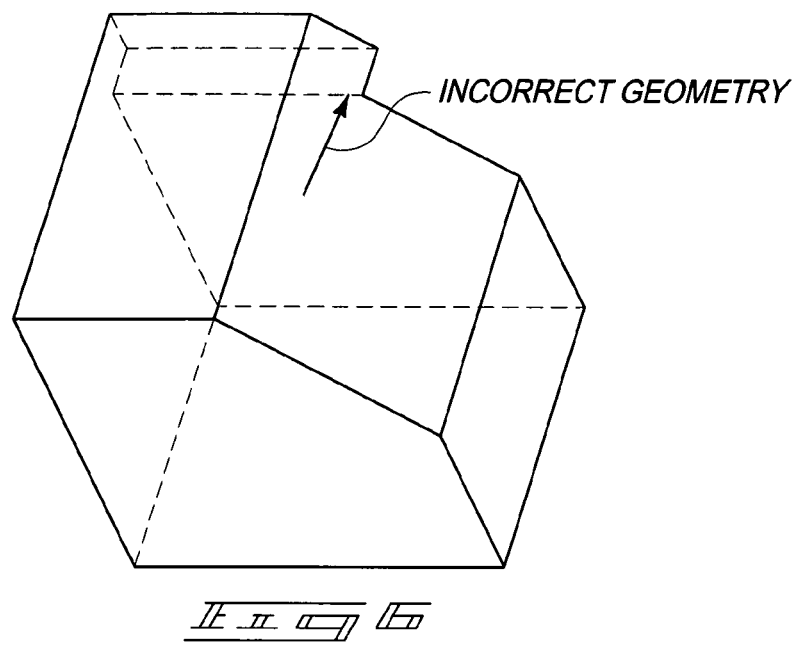
FIG. 6 shows the correct geometry for the target geometric model shown in FIG. 5.

FIG. 5 illustrates an exemplary target geometric model created from a source geometric model, the target geometric model having an incorrect geometric feature, while FIG. 6 shows the feature with correct geometry. The feature creation analysis performed using the present invention determines when a feature has been created incorrectly in the target CAD system immediately following the creation of that feature. The geometric feature shown in FIG. 5 was incorrectly created using a blind depth. The geometric feature should have been created with a depth controlled by the angled surface as shown in FIG. 6. Current techniques fail to detect such an error until final analysis or until many other features have been built based on the incorrect feature, thus making the model unstable. In addition, building features based on an incorrect feature, creates errors that force a complete re-mastering of the target model from the point of the incorrectly created feature, thus increasing the translation time for converting a source model into a target model.

Figure 7:
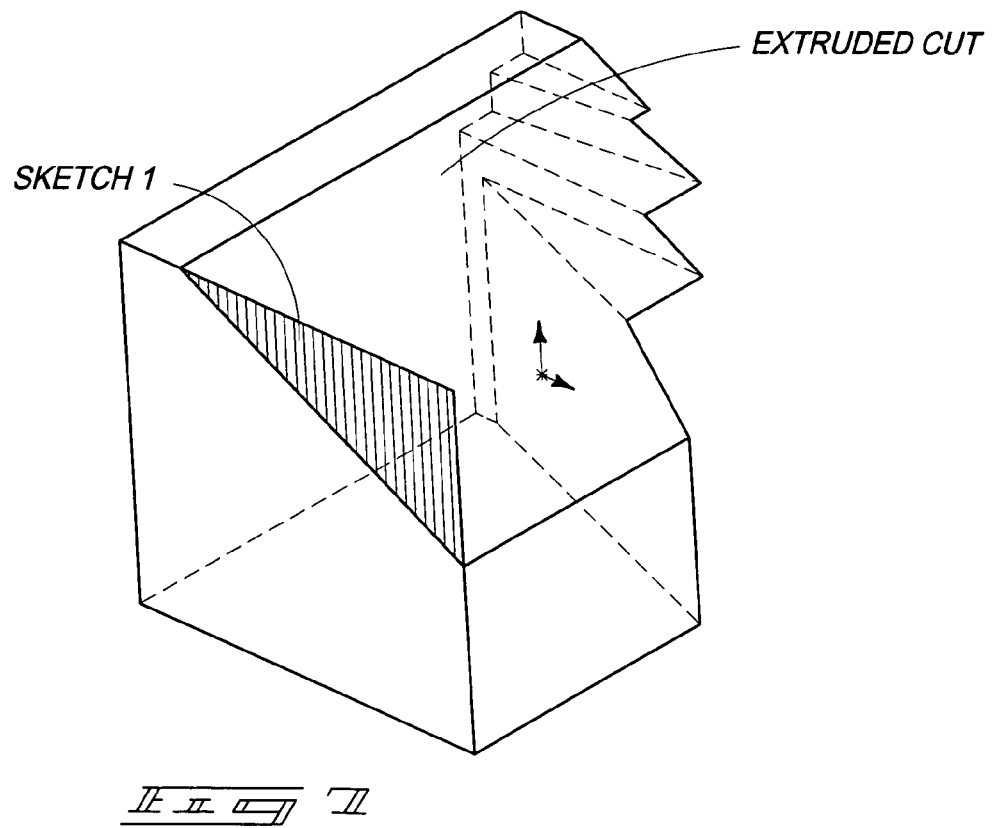
Figure 8:
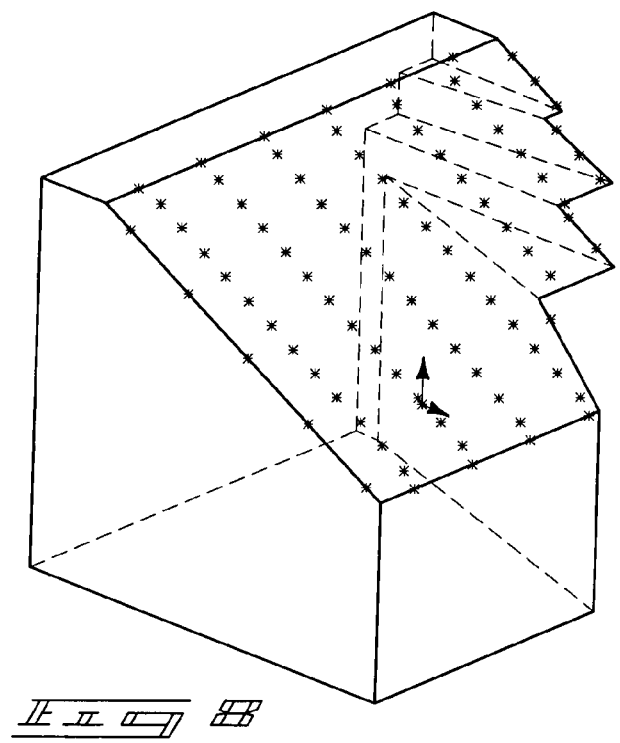

FIGS. 7 through 11C show various exemplary illustrations in order to more clearly explain the inventive concept. Assume that FIG. 7 is the source model and the extruded cut is the feature being created. If the feature was defined to be an extruded cut using sketch 1 and extruded up to the last surface in the model, then the cut ends up going all the way through the model. FIG. 8 illustrates how a point cloud from the feature created in FIG. 7 would appear.

Figure 9A:
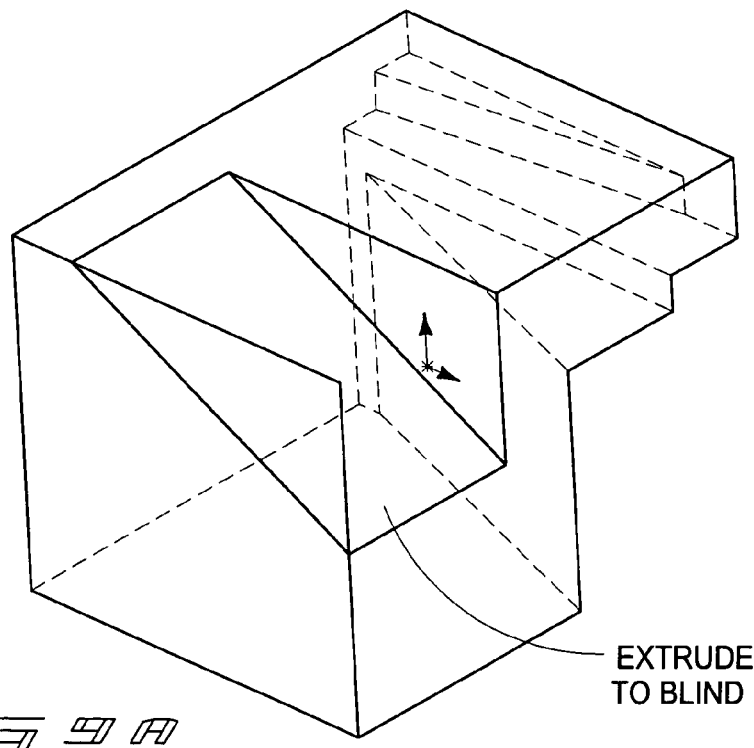

Now, assume that when the feature, such as the one in FIG. 7, was created in the target CAD system, instead of creating an extruded cut proceeding up to a specific end surface, a blind depth type of cut was created that failed to completely penetrate through the model as shown in FIG. 9A. The mirror model comparator 92 of translation engine 57 (FIG. 2) detects numerous points that do not lie on the surface of the cut, nor do they lie and edge belonging to the cut. In one technique, such a phenomenon would immediately trigger an interrupt, and the operator could then interactively select the desired surface. The system of the present invention, however, redefines the cut to extrude up to an existing surface and then re-runs the feature creation analysis. The operator is only notified if the system, after a predetermined number of iterations, fails to accurately represent a geometric feature.

Figure 9D:
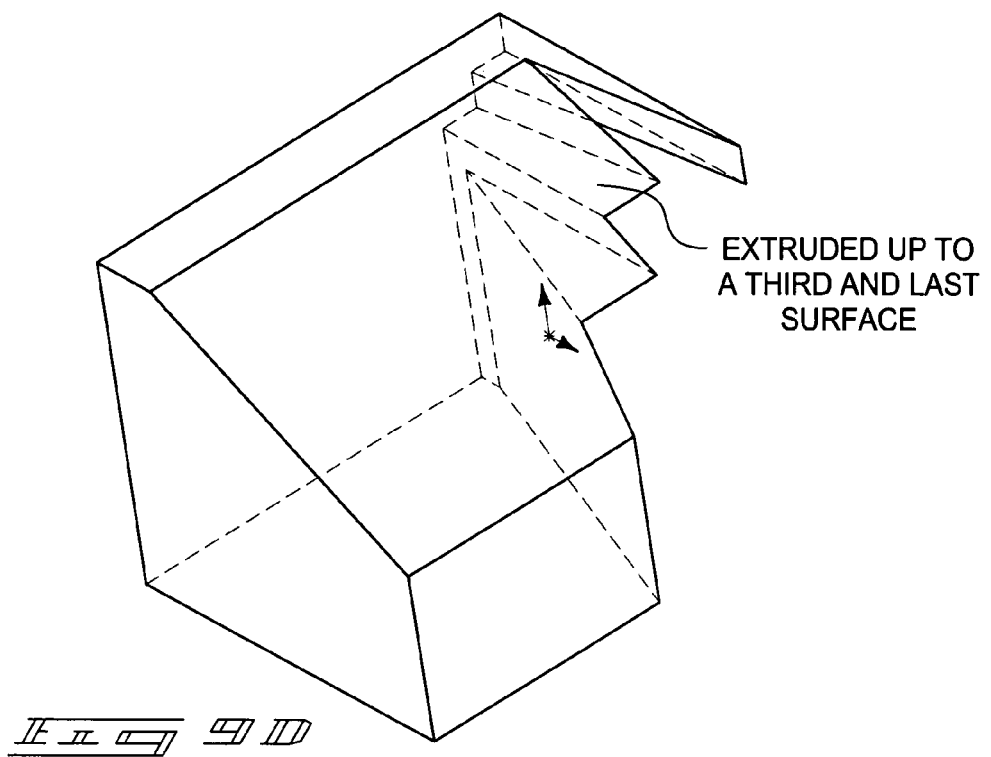

Also, if the cut was defined as an "up to surface" cut and the surface nearest the sketch plane was selected as shown in FIG. 9B, the feature creation analysis would detect that some points do not lie on the surface or edges of the cut, thus causing the process of generating the feature to iterate the cut again by selecting a different surface, or ultimately cause an interrupt to a user if the discrepancy is not rectified after a predetermined number of iterations. As one steps through the possible iterations, the feature creation analysis may detect errors in geometry as the analysis progresses through the creation of the extruded cut until the correct geometry is achieved. FIGS. 9C and 9D illustrate such exemplary scenarios.

Figure 10A:
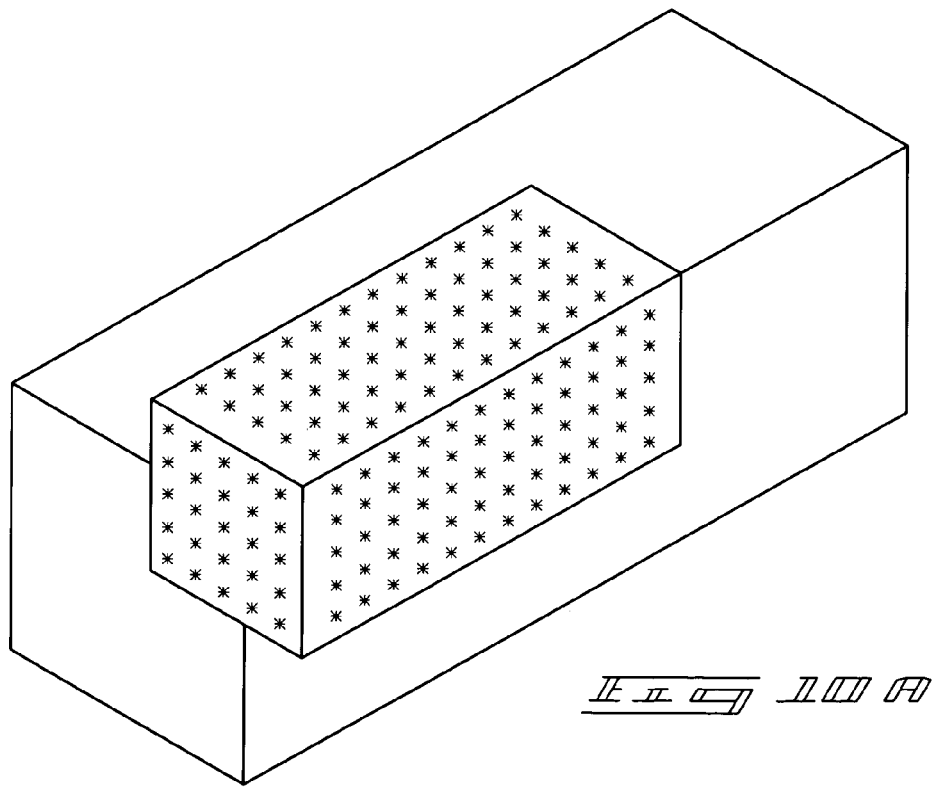
Figure 10B:
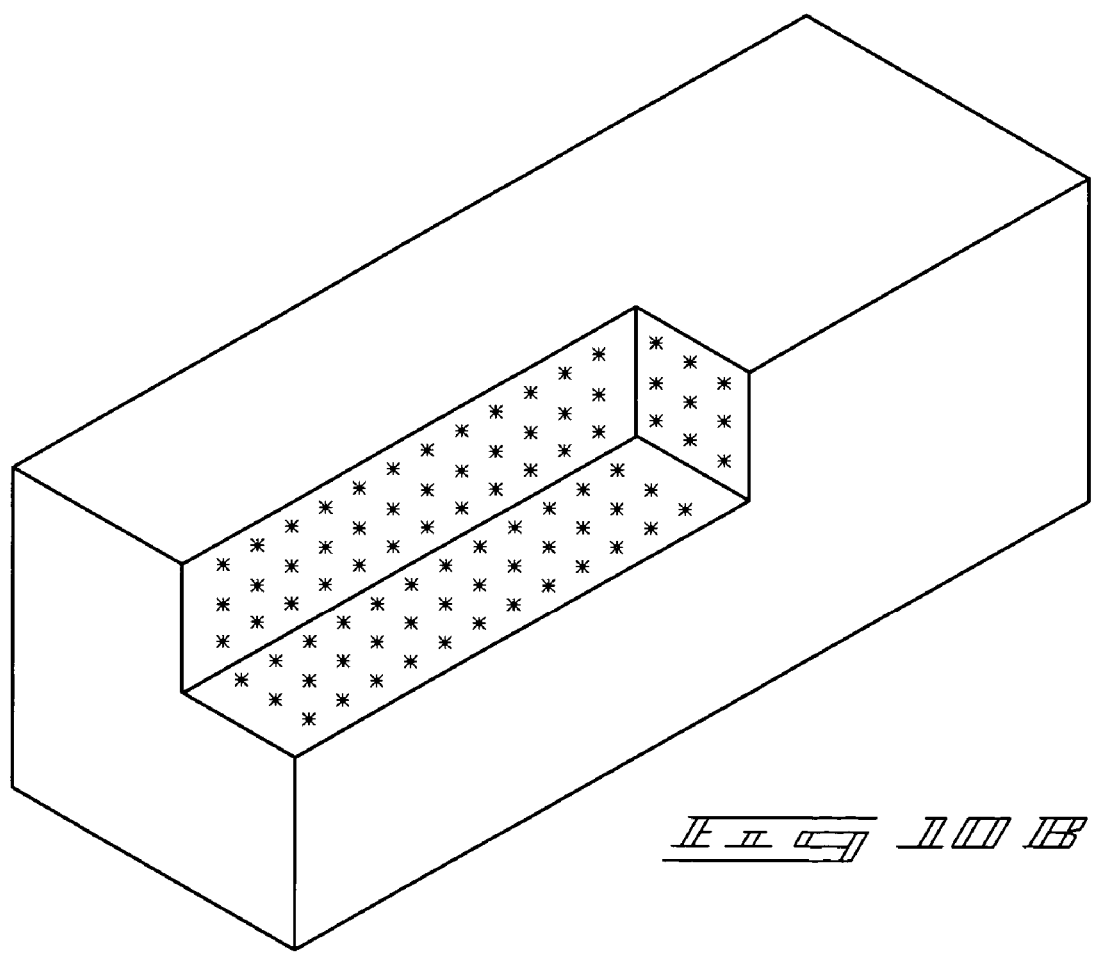

FIG. 10A illustrates pre-Boolean point cloud on a pre-Boolean surface while FIG. 10B illustrates a post-Boolean point cloud on a post-Boolean surface. It will be appreciated that for different geometric feature types, and source and target systems, different types of point cloud data may be necessary. Some CAD systems do not have a pre-Boolean feature as they are linear CAD systems and not Boolean based.

Various types of feature creation analysis data include:
1. Source Features Pre-Boolean Surfaces
2. Source Features Post-Boolean Surfaces
3. Target Features Pre-Boolean Surfaces
4. Target Features Post-Boolean Surfaces
5. Target Solid
6. Volume difference
7. Surface Area difference
8. Mass properties difference Various methods for Feature Creation Analysis include
1. Point cloud (Pxi) analysis where the method includes directly comparing source geometry vs. target geometry.
2. Volume, surface area, mass property analysis where pre-boolean and post-boolean values of a target are compared with source's pre-boolean and post-boolean values.
3. Section analysis—this method verifies section location, section geometry, and section orientation of a target geometric model after creation.
4. Feature parameter analysis—this method includes verifying that a feature was created successfully by extracting more parameters/data from the source feature and comparing the parameters/data to the target feature.

Methods of Feature Creation Pxi Analysis Extraction
1. Extract pxi from interrupt surfaces—In this method, data exists only when needed during creation of a feature.
2. Extract pxi from within CAD systems—this method includes storing data within a model tree file (MTF).

Proposed Methods of Feature Creation Pxi Analysis

|  | Pre-Boolean Target Feature Surfaces | Post-Boolean Target Feature Surfaces |
| --- | --- | --- |
| Pre-Boolean Source Feature Surfaces | Source pxi on target surfaces (FIG. 11A) | Target pxi on source surfaces (FIG. 11B) |
| Post-Boolean Source Feature Surfaces | Source pxi on target surfaces (FIG. 11B) | Source pxi on target surfaces<br>Source pxi on target solid (FIG. 11C) |

FIG. 11A shows another illustration of a pre-boolean point cloud on a pre-Boolean target feature surface, and FIG. 11B illustrates a post-boolean point cloud on a pre-boolean surface. FIG. 11C illustrates a post-boolean point cloud on a post-boolean surface.

Design Intent Source Analysis

With reference to design intent source analyzer 88 (of FIG. 2), there are three purposes for design intent source analysis: First, design intent source analysis is performed to evaluate the "manufacturing design intent" of the source CAD file to assist in the feature mapping between the source and target CAD systems. Secondly, design intent source analysis is performed to provide process mapping and routing details to the translation production line. Finally, design intent source analysis is performed to predict the cost of the translations and to convey a quotation back to a customer that has requested translation services.

Design intent is conveyed and interpreted by evaluating the methods used to define the geometry in the source file, and determining which methods a designer would use in order to create the same geometry in the target CAD system. A method of creating a specific feature may be perfectly natural to a designer using a source CAD application. However, that method may be very unnatural to a designer using the target CAD system. After performing design intent analysis, such methods are identified, and a natural method mapping can occur.

For example, in Pro/E a designer would create a hole by inputting the hole command, specifying the location of the hole, and the size (or dimensional) parameters of the hole, as shown in FIG. 12. FIG. 12A illustrates a model of a solid cube comprising solid base material. FIG. 12B illustrates a hole which has been inserted on a face of the cube by a Pro/E designer who has created a hole in the solid material of the cube by specifying the surface and location for the hole, and the hole dimensional parameters. In contrast, FIGS. 13A-D illustrate how a CATIA designer would create a hole by creating a solid cylinder having a desired dimension, locating the cylinder and orienting it relative to the solid cube in which it is desired to put a hole, and then subtracting the solid cylinder from the base solid cube material. Accordingly, the same function in CATIA is accomplished by creating a solid cylinder, locating and orienting the cylinder relative to the cube model, and subtracting the solid cylinder from the remainder of the cube model. FIG. 9A illustrates the cube comprising a solid base material. FIG. 13B illustrates creation of the solid cylinder. FIG. 13C illustrates a cylinder, located and oriented in a desired configuration. FIG. 13D shows the cylinder after it has been subtracted from the base, or cube. Table 2, below, illustrates in summary a natural method mapping for a Pro/E CAD file feature as well as a CATIA CAD file feature map.

TABLE 2

Natural Method Mapping

| Pro/E CAD File Feature | CATIA CAD File Feature Map |
| --- | --- |
| Hole | Sol. Cyl → Locate & Orient → Subtract Sol. Cyl from Base solid |

It is probable that some of the geometric features created by the source CAD application are created in such a manner that the target CAD application cannot create the same geometry using the same method of creating it. One reason this happens is because the specific feature functions that were used in the source system do not exist in the target system. Another reason is due to approximation algorithms. Most CAD systems approximate complex geometry using proprietary algorithms. It is very unlikely that two CAD systems will use the same algorithms to approximate the same geometric features. Therefore, differences in the geometry are bound to occur even though the feature in the target file was created using the same methodology as the feature in the source file. Regardless of the cause of any inaccuracy, the solution is the same: A set of features needs to be found in the target CAD system that duplicates the geometry found in the source file. This requires mapping of feature geometry methods to the target CAD system.

In order to accurately predict the cost of converting a CAD model file, there are four pieces of information necessary. First, the size of the file; secondly, the number of geometric features that need to be converted; thirdly, the type of features; and finally, source and target CAD file applications. The source design intent analyzer performs a series of scans on the source file in order to determine this information. First, it counts the number of features in the source model file and parses them into specific feature type categories. Then, the features are classified into categories of a) geometry that always automatically converts over every time; b) geometry that automatically converts over X% of the time; and c) geometry that never automatically converts over and requires operator assistance to complete it. This classification will be specific to the particular source and target CAD systems. Once the features in the source model file are categorized and counted, then simple algorithms can be used to predict the conversion cost.

Native-To-Native Geometry Conversion

According to the present translation engine implementation, the approach to CAD file conversion is based upon the assumption that a purely automated software solution is not possible. Existing technical barriers are numerous, which prohibits a purely automated software solution. Therefore, a technology is needed that integrates the automatic recreation of geometry in the target CAD system.

There are two major steps to the native-to-native geometry conversion process of converter 90 (see FIG. 2). First, there is a source to Applicant's model format (an intermediate format) conversion. Secondly, there is Applicant's model to target file conversion.

Both of these steps are accomplished by utilizing the CAD system's own application program interfaces (API's). The source CAD system's own function calls are then used to extract a list of the geometric features that make up the source model file. These features and their defining parametric data are stored in a series of Applicant's proprietary data formats. The formats are described in the algorithm section and described in the PCT Application PCT/US01/45501, filed on Oct. 30, 2001, the entire contents of which are incorporated herein by reference. Utilizing the equivalent function calls for the target CAD system, the geometric features are recreated by reading the geometric feature data from the Applicant's model formats. This provides a "hub and spoke" type of configuration in which once a CAD system is implemented to write to and read from the Applicant's model formats, it is then possible to convert file to or from any other CAD system that is implemented.

In order to facilitate the process of converting from a source file format to Applicant's formats and from Applicant's formats to a target file format, several CAD system specific utilities were developed. These utilities perform specific tasks including but not limited to: extracting mathematical geometric data from the source model file and storing it in Applicant's proprietary format, mapping certain geometry generation function calls from Applicant's formats to the appropriate target CAD system function calls, and determining specific geometric data that is not necessarily provided by the source CAD system, but will be needed in order to generate the equivalent geometry with the target CAD system.

Geometric Model Comparison

Geometric model (or mirror-model) comparison is the process of comparing each geometric feature of the source CAD file with corresponding geometric features of the target CAD file in order to determine if discrepancies exist. The comparison consists of measuring, for each geometric feature, the distances between the corresponding surfaces and boundary edges of the two files. If the geometric features of the target file are a perfect duplicate of the corresponding features of the source file, then all of these measurements will yield zero distances.

The process invokes Applicant's point cloud data (or Pixie Dust) analysis process, which creates a series of points that lie on the surfaces and edge curves of each geometric feature of a model. These points are then brought into the target CAD model file and the distance from the points to the corresponding surfaces and curves are measured. Any points that lie on the appropriate surface or edge curve, or within acceptable tolerances, are deleted from the target model. The points that lie outside of the acceptable tolerances are flagged as errors in the model file. In the event of identifying discrepancies between a geometric feature in the two files, the process of generating such geometric feature is iterated a predetermined number of times in order to ensure that the geometric feature in the target file is an accurate representation of the corresponding geometric feature from the source file. In the event of a failure to automatically and accurately generate a geometric feature of a source file in a target file, an operator is notified of such failure in order to rectify the discrepancies and thereby accurately generate the feature.

The reverse of the above process, where points are extracted from the target model file and are inserted into the source file can also be invoked. This increases the probability of finding all of the discrepancies between the two files and reduces the probability of an error going undetected.

An operator can then select which type of point cloud analysis to run among tessellated points, surface points, and edge points techniques, the advantages and disadvantages of which techniques were described above in Table 1.

The translation production line concept is a process that treats CAD file conversion as a manufactured product. The process applies manufacturing production line techniques to the process of converting CAD file formats.

As shown in FIG. 14, staged translator 56 includes a translation engine 57. Translation engine 57 implements conversion/translation and analysis/inspection when converting from a source CAD model (or file) (or a CAD file that a customer wishes to convert from) to a target CAD model (or file) (or a CAD file that a customer wishes to convert to). For example, various different source CAD files and target CAD files are shown in FIG. 14. For example, a Pro/E CAD file 100, an SDRC CAD file 101, and a Unigraphics CAD file 102 each comprise source CAD files; whereas, a CATIA CAD file 103, a SolidWorks CAD file 104, and an AutoCAD file 105 each comprise target CAD files.

The translator implementation of FIG. 14 enables a relatively efficient quotation process when the system of the present invention is used to implement staged translation for a third party desiring translation of drawings from a source CAD file into a target CAD file. Such a process entails: reviewing source CAD model geometric features using feature statistics; implementing design intent analysis and feature parsing; and estimating conversion costs based upon the number of features, and the types of features identified.

FIG. 15 illustrates a feature based Boolean tree. FIG. 16 illustrates a respective Boolean based CSG tree. By mapping the regeneration process using the feature based tree of FIG.

15 and the Boolean based CSG tree of FIG. 16, the manner in which errors can be easily and serially displayed to a technician in a serial manner and in a target CAD file are readily apparent. A technician can complete features that the software cannot properly and automatically complete (as identified by an interrupt interface). Furthermore, the technician can additionally or alternatively repair any errors, that are not automatically corrected by the software, that exist within the geometry as identified by the system.

Overall Implementation

In order to implement the computerized design model (or file) translation system features of the present invention, the following methodology is carried out. In Stage 1, a source model file design intent analysis is performed. Subsequently, a Stage 2 analysis generates a duplicate target model file with geometric features corresponding with the geometric features of the source model file with the pre-existing, source model file. In Stage 3, a mirror-model comparator analysis is implemented by way of a forward check, a backward check, or a forward and backward check. In Stage 4, in the event of any identified discrepancies between the geometric features of the source and target files, such geometric features are regenerated using alternative features/groups of features until the discrepancies are determined to be within a pre-specified tolerance. For example, if a chamfer is incorrectly created using an angle and a distance to two surfaces, the method of creating the chamfer is iterated by switching the pairing of the angle and distance with the two surfaces. Attempts to correctly recreate a geometric feature are iterated, for a prespecified number of times, by making minor changes, as noted above for instance, in each iteration. Finally, a Stage 5 operation entails an operator inspecting the resulting analysis file and correcting discrepancies that are not automatically corrected, and then rerunning the analysis of Stage 3 by way of a mirror-model comparator.

According to Stage 1, source model file design intent analysis entails receiving a pre-existing, or source model file, then storing the model file in memory. Subsequently, the pre-existing, source model file is opened using a source CAD system. Next, the pre-existing, source model file architecture is evaluated, and the model file is exploded. Subsequently, construction history indicating how the model was originally graphically built is then examined. Furthermore, comparison reference data (or point cloud data) for each geometric feature is then extracted. Finally, the extracted data is stored in a designated metafile format (an intermediate file format).

In Stage 2, the methodology includes launching a target CAD system. Subsequently, a target model file is recreated, duplicating the same process that was used to create the original pre-existing, source model file. Interrupts are subsequently generated, when necessary, indicating to an operator that help is needed in recreating the target model file. For example, an interrupt can be displayed on a user display screen to a user indicating "I need help". Finally, Stage 2 entails an operator "clearing" any interrupts (or removing and fixing the cause) that are presented to the user or operator during recreation of the target model file.

In Stage 3, the methodology entails a forward check and a backward check. In the forward check, points are created in the target CAD file representing the location of edges, and surfaces of the source model. Distance is then measured between the points and the edges/surfaces. Subsequently, points are deleted that fall within a predetermined tolerance. The forward check is finally completed by saving a model file containing "bad" points, or points that fall outside the predetermined tolerance. The backward check is implemented in the same manner as the forward check, except point cloud data is extracted first from the target model, then compared with point cloud data extracted from the source model. A forward and backward check entails performing both checks, then saving "bad" points from both check into a common file. Stage 4 of the methodology includes regenerating the geometric features, by using an alternative process of generating the geometric feature or by using alternative features/groups of features, in the target file in order to accurately generate the same in comparison with the source file. After regenerating the geometric features where discrepancies were previously observed, the analysis is rerun in order to determine whether the regeneration of the geometric feature remedied the discrepancy. Stage 5 is implemented if the discrepancy is not automatically remedied after a predetermined number of iterations of regenerating the geometric feature.

Stage 5 of the methodology includes an operator inspecting the analysis file resulting from the previous stages. Next, distances are measured between points and edges/surfaces. Subsequently, points that deviate, or fall outside a predetermined value are identified. The operator then corrects any errors in the analysis file. Finally, the operator reruns the analysis, starting again with Stage 3 in order to determine whether the corrective action has remedied the problem with respect to the geometric data which is requiring corrective action to fall within the predetermined tolerance.

Figure 17A:
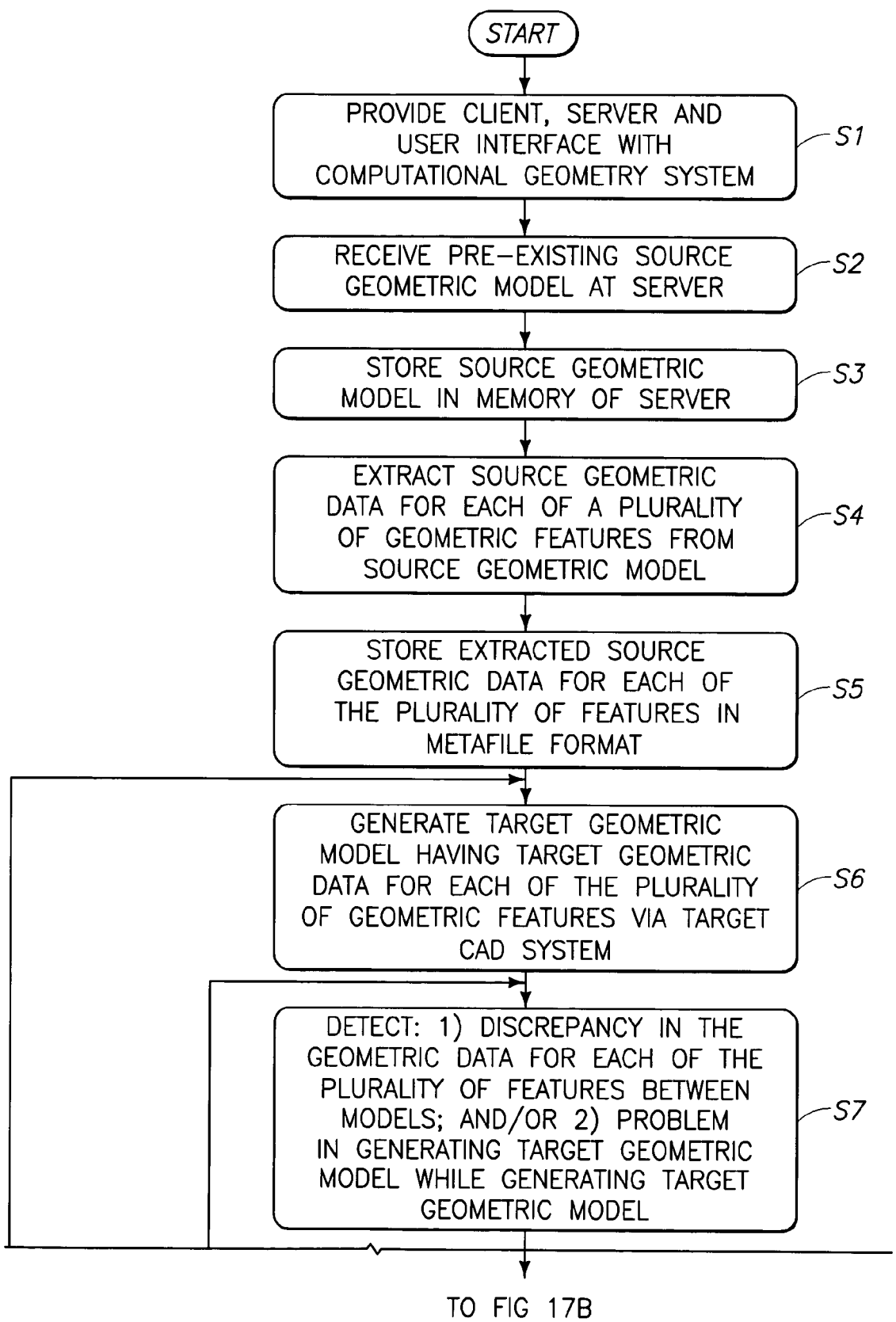

FIG. 17 illustrates by way of example one method for creating a target geometric model file from a source geometric model file wherein an interrupt is presented to a user at a user interface in a timed manner that occurs serially during creation of a geometric feature in the target geometric model and when a discrepancy is detected during creation of the target geometric model file. In this manner, a serial arrangement of interrupts can be presented to a user in the event of the server's inability to accurately generate a geometric feature as the process of creating a plurality of geometric features in the target geometric model file progresses from start to finish. In response to each interrupt, the user is given an opportunity to evaluate the discrepancy and correct such discrepancy, after which the check is re-performed in order to confirm compliance of the target data with the respective source data.

As shown in FIG. 17, a logic flow diagram illustrates the steps of implementing a serial interrupt interface process when creating a target geometric model from a source geometric model.

In Step "S1", a server and a client of a computational geometry system are provided having a user interface that is used to provide an interrupt to a user. After performing Step "S1", the process proceeds to Step "S2".

In Step "S2", the system receives a pre-existing, source geometric model at the server. After performing Step "S2", the process proceeds to Step "S3".

In Step "S3", the system stores the source geometric model in memory of the server. After performing Step "S3", the process proceeds to Step "S4".

In Step "S4", the source geometric data for each of a plurality of geometric features is extracted from the source geometric model. After performing Step "S4", the process proceeds to Step "S5".

In Step "S5", the system stores the extracted source geometric data for each of the plurality of geometric features in a metafile format. After performing Step "S5", the process proceeds to Step "S6".

In Step "S6", the system, using a target CAD system, generates a target geometric model having target geometric data for each of the plurality of geometric features. After performing Step "S6", the process proceeds to Step "S7".

In Step "S7", the system detects at least one of a discrepancy in the geometric between a geometric feature from the source geometric data and a corresponding feature from the target geometric data in order to rectify the discrepancy. After performing Step "S7", the process proceeds to Step "S8".

In Step "S8", a query is made to determine if a geometric feature in the target geometric model is accurately generated. If yes, a target geometric model is generated as indicated at Step S14. If the geometric feature is not accurately generated, then the process of generating the geometric feature is iterated, using alternative features/group of features, as shown in Step S9. Such process is iterated for a predetermined number of times. After performing Steps S8 and S9, the process proceeds either to Step S10 or Step S14 depending on the outcome of the query as indicated in step S8.

After iterating the process of generating the geometric feature, if the system fails to accurately generate such feature, the process proceeds to Step S10.

In Step S10, an interrupt is generated at the user interface if the discrepancy is not rectified after performing a predetermined number of iterations.

In Step "S11", the system interrupts generation of the target geometric model in response to generating the interrupt. After Step "S11", the process proceeds to Step "S12".

In Step "S12", a user fixes the problem and/or discrepancy. After Step "S12", the process proceeds to Step "S13".

In Step "S13", a user clears the interrupt using the user interface. After Step "S13", the process proceeds to Step "S14".

In Step "S14", a query is made as to whether the model generation process is complete. If the file generation process is determined to be complete, the process is terminated. If not, the process returns back to Step "S6".

FIG. 18 illustrates by way of example one method for managing computational geometry system translations by way of a geometric model comparator that utilizes point cloud features as well as a forward check, a backward check, and/or forward-backward check. In this manner, selected points for each of a plurality of geometric features can be identified from a source model (or file) and corresponding selected points can be generated in a target model (or file). For each geometric feature, the selected points are compared from the source model with the selected points from the target model in order to identify one or more selected points from the target model that fall outside of a predetermined tolerance range with respect to one or more points from the source model. A geometric model comparator compares the input data with corresponding output data and identifies any geometric discrepancies between the input data and the output data.

As shown in FIG. 18, a logic flow diagram illustrates the steps of implementing such a geometric model comparator.

In Step "S1", a server and at least one client are provided within a client/server network environment. After performing Step "S1", the process proceeds to Step "S2".

In Step "S2", the system receives source geometric data, for each geometric feature, including corresponding comparison reference data extracted from a pre-existing source model at the server within memory. After performing Step "S2", the process proceeds to Step "S3".

In Step "S3", the system stores the extracted comparison reference data within a meta file format utilized by Applicant's system. After performing Step "S3", the process proceeds to Step "S4".

In Step "S4", the process proceeds by opening the source model using a source CAD system, such as for example, CATIA. After performing Step "S4", the process proceeds to Step "S5".

In Step "S5", the process proceeds by generating target geometric data, corresponding to a geometric feature of the source geometric model, including comparison and reference data created in a target model. After performing Step "S5", the process proceeds to Step "S6".

In Step "S6", the process identifies discrepancies between the target geometric data and the source geometric data by comparing the target geometric data related to a geometric feature with corresponding source geometric data. After performing Step "S6", the process proceeds to Step "S7".

In Step "S7", the process queries if discrepancies exist from Step S6, and if true, the process iterates Step S8, using alternative features/group of features, a predetermined number of times before proceeding to the Step S8 of notifying a user. On the other hand, if no discrepancies are found in Step S7, the process returns to Step S9.

In Step "S9", a query is made as to whether the operation of identifying discrepancies is complete. If the process is not complete, the process returns back to Step "S6". If the process is determined to be complete, the process is terminated.

FIG. 19 illustrates by way of another example a machine-executed method for implementing a geometric file conversion on a computer system including an interface.

In Step "S1", a source geometric model is received at a computer. After performing Step "S1", the process proceeds to Step "S2".

In Step "S2", the source geometric model is stored in memory of the computer. After performing Step "S2", the process proceeds to Step "S3".

In Step "S3", the source geometric model is converted into a target geometric model. After performing Step "S3", the process proceeds to Step "S4".

In Step "S4", the source comparison reference data is extracted from the source geometric model, wherein the source comparison reference data comprises point cloud data for each geometric feature. After performing Step "S4", the process proceeds to Step "S5".

In Step "S5", target comparison reference data for a corresponding geometric feature is extracted from the target geometric model. After performing Step "S5", the process proceeds to Step "S6".

In Step "S6", the source comparison reference data is compared with target comparison reference data in order to identify geometric discrepancies. The comparison is implemented by determining whether point cloud data from the target geometric model lies outside of a terminal surface of point cloud data from the source geometric model using a predetermined geometric tolerance. After performing Step "S6", the process proceeds to Step "S7".

In Step "S7", the process queries to determine discrepancies. If true, the process iterates Step S3, using alternative features/group of features, a predetermined number of times. If discrepancies still exist, the process proceeds to Step S8. If no discrepancies exist, then the process proceeds to Step S9.

In Step S8, a user or operator is interrupted at the interface of the computer system when a geometric discrepancy is not rectified by the system even after a predetermined number of iterations and/or a problem is encountered during converting the source geometric model to the target geometric model. After performing Step "S8", the process proceeds to Step "S9".

In Step "S9", a query is made as to whether or not the discrepancy identification is complete. If the discrepancy identification is not complete, the process returns back to Step "S6". If the discrepancy identification is complete, the process is terminated.

FIG. 20 illustrates by way of yet another example a high-level process flow diagram for implementing file translation from a source format to a target format. Step S1 includes providing a source model having a plurality of geometric features. In step S2, a geometric feature of the source model is translated into a corresponding geometric feature in a target model. In step S3, the geometric feature of the source model is compared with the corresponding geometric feature in the target model. Step S4 determines if there are any discrepancies in the geometric feature of the source and target models. If true, a user is notified after performing a predetermined number of iterations by proceeding to step S2, using different measurements during each iteration, to rectify the discrepancies. If no discrepancies are identified in step S4, the process proceeds to step S6 to determine if there are any more geometric features to translate. If true, the process proceeds to step S2. Otherwise, a target model using all translated features is generated in step S7.

Translation Process Overview—

Translation Process Principles

Applicants have developed a unique approach to the task of translating Computer Assisted Design (CAD) models from one format to another. The process is designed to a) maximize the quality of the translation, b) minimize cost of translation. In order to achieve these two goals it is necessary to ascertain the geometric accuracy of the translation, and perform the translation with a minimization of human interaction time.

As to determining the geometric accuracy of the translation, a method has been developed for comparing a source CAD model (model to be translated), with a target CAD model (the translated model). The objective of this comparison is to locate and convey any differences in geometry that may exist between the two models—the comparison being performed for each geometric feature. In the event of a failure to automatically rectify any differences in the geometric features between the two models by iterating the process of generating the geometric feature as discussed above, an operator is notified of such failure so that they can be resolved. For purposes of this comparison, the source model geometry for each geometric feature is defined to be correct. The comparison method involves comparing, for each geometric feature, all boundary surfaces, their trim curves, and all model edges to one another. This method is useful for locating differences in geometry, missing geometry, or extraneous geometry in the target model.

Human interaction is minimized by providing a systematic process in which operations that can be automated are done so without human input, and the operations that cannot be automated are presented to the human operator in a manner that displays the specific problem concisely and efficiently, and provides the operator with all of the information necessary to quickly arrive at the solution. Operations which can be automated are performed in the "background" while any human intervention operations are performed in the "foreground".

The translation process employs the necessary controllers and systems to notify the human operator in the event it needs assistance to resolve a specific translation problem, or has incorrectly created the geometry in the target model. When the system needs such assistance, it displays the target model to an operator along with information to help the operator determine the nature of the problem, and a satisfactory solution to it. The operator then fixes the problem, and passes control of the translation process back to the system to be completed in the background. If the system needs further assistance, it will repeat the process of notifying the operator, and displaying the problem. During the process of creating the geometry in the target model and also upon completion of translation of all the geometry, the system analyzes the quality of the translation as described above to ascertain the translation accuracy. If it finds a discrepancy or problem with either the geometry or with the process of creating the geometry, and if such problems or discrepancies are not automatically corrected after a predetermined number of iterations to accurately generate geometric features where discrepancies were found, then the system displays the discrepancy/problem to a human operator for assistance in resolving the differences between the models.

Geometry Deviations

Point Cloud Displaying Bad Geometry

Applicant's translation system uses the Geometric Analyzer (GA) that it has developed to determine if and where two CAD model files are geometrically different. Once the differences have been determined by the GA, the bad points are displayed in the target model file. By directly viewing these representations of where the surfaces and edges of the erroneous geometric features are supposed to be, the operator can determine the nature of the discrepancy.

Surface Representations

If desired, an operator can import a Non-Uniform Rational B-Spline Surface (NURBS) from the surfaces of selected features directly from the source model file, providing the operator with points along the surfaces and edges as well as the surfaces themselves. A NURBS surface is a standard format provided by Applicant for exporting CAD surface information to enable translation and analysis. Most CAD systems possess the functionality necessary to export NURBS (or NURB surfaces).

Analysis Report

An analysis report is displayed to the operator detailing the type of analysis that was performed, and the quantity of errors found. If the translation is completely accurate, the report summary quickly indicates to the operator that there are no discrepancies. The operator can quickly move to the next analysis, or the next job without the need to review the model, thus saving the operator inspection time.

When analysis reveals inconsistencies between the source and target models, the report indicates to the operator how many points are not within tolerance. Therefore, the operator is given an indication of how much of the model file is erroneous.

Translation Log Viewer

Applicant has developed a Log File Viewer that provides the operator with essential information including feature regeneration status, feature identification mapping between the source and target CAD systems, and partial geometry identifications. The operator can toggle the display parameters to display any combination of features including successfully completed features, failed features, and feature types. This allows the operator to quickly sort through the translated model file and get essential information on any feature desired.

In addition, the log file for each feature displays information regarding where to find a feature's construction geometry such as the section(s), and trajectory (if applicable). This allows the operator to quickly filter to the desired information and find the desired geometry in the target model file.

Failed Feature Aids

In the event that a feature fails to be created in the target model file, then one or more of the following aids will be inserted into the model to assist the operator in interactively creating the failed feature.

Defining Parameter Indication

Certain feature types such as rounds (fillets) and drafts will have their defining parameter and reference information displayed to the operator. For example, if a fillet fails, then the associated model edges that are supposed to be filleted will be highlighted. In addition, the radius of the fillet will be displayed with a leader pointing to the specific edge or edges to which the radius is to be applied.

Likewise, drafts will be noted by placing the neutral plane in place, and highlighting the specific surfaces to apply the draft that applies to the specific surface(s). The draft angle will be indicated with a leader to the surfaces. Similar information can be provided for chamfers, patterns, copied or translated (moved) features, and mirrored features.

Construction Geometry for Failed Features

When a feature fails in the target model, usually the construction geometry required to create the feature is created in the target model. For example, a swept cut in which the cut section is a circle and is being swept along a trajectory curve might fail to actually build the cut in the target model. However, the section and the trajectory are placed in the model in the correct locations.

The operator merely needs to interactively complete the sweep operation selecting the section and trajectory when prompted to do so by the CAD system.

Import Surfaces and/or Edges of Failed Features

The surface representations that are described above in the Geometry Deviations section are very accurate representations of the individual surfaces that exist in the source model. These surfaces and/or the edges that represent the edges of these surfaces are automatically placed in the target model by Applicant's translation system in the event a feature fails. An operator can interactively use these surfaces to create a boundary representation (B-Rep) of the failed feature, thereby completing the feature.

The surfaces and/or edges can also be used by the operator simply as an aid in determining what the specific feature should look like. If an operator decides to build the feature using parametric or other common techniques instead of a B-Rep, then the new feature can be compared to the surfaces and/or edges as an alternative method of determining accuracy. The surface and/or edges could also be used to assist in generating necessary construction geometry for the feature by using its edges, or important intersections with other features as guides. Therefore, the surface can be a very powerful tool for the operator to finish features that for some reason could not be translated by software alone.

Some additional advantages of the present invention over prior approaches include the following:

(i) Although knowledge about existence of an error is desired, it is equally important to know the location and magnitude of the individual discrepancies. Prior approaches using mass properties comparison fail to indicate to a user the location and magnitude information pertaining to an error. The present invention offers a solution to this problem.

(ii) A mass properties analysis of a 3D CAD model is an approximation. The accuracy of the approximation depends on the calculation techniques used in the CAD system to output the values and the modeling precision available in the CAD models. Using the mass properties comparison approach, small errors would likely go unnoticed. However, using the present invention, such small errors are detected.

(iii) In the event that there is more than one error in the target model, it is likely that the errors will occur in locations that cancel or reduce the resultant effects on the differences of center of mass and moments of inertia values. For example, if two errors exist in the translated geometry and are located on opposite sides of the center of mass, such errors tend to cancel each other. The present invention enables one to make sure that two different CAD models are geometrically the same.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system for generating a target geometric model from a source geometric model, comprising:
    a server having processing circuitry and an operation manager configured to compare source geometric data of each of a plurality of features in a source geometric model with target geometric data of respective features in a target geometric model, and operative to identify discrepancies in respective features therebetween;
    said server configured to rectify discrepancies in a feature after generating the feature and prior to generating another feature among the plurality of features;
    a communication link;
    at least one client communicating with the server over the communication link; and
    an interrupt interface provided by one of the at least one client and the server and operative to notify a user of the server's inability to automatically generate an accurate representation of a feature of the source geometric model in the target geometric model.

2. The system of claim 1, wherein the server is configured to iterate, a predetermined number of time, the process of generating a feature using alternative measurements during each iteration.

3. The system of claim 2, wherein the interrupt interface notifies a user of the server's inability to rectify a discrepancy in a feature after performing the predetermined number of iterations to accurately generate the feature.

4. The system of claim 1, wherein the interrupt interface notifies a user of the presence of any identified discrepancies that are not automatically corrected by the server in response to comparing the geometric data.

5. The system of claim 1, wherein the operation manager includes a computer readable medium having computer programmable logic embodied therein which when executed by the processing circuitry translates each feature of a source geometric model received from a source within a client/server environment to a respective feature in a target geometric model.

6. The system of claim 1, wherein the source geometric data is derived from the source geometric model and the target geometric data is derived from the target geometric model.

7. The system of claim 5, wherein the computer readable medium comprises a memory coupled to the processing circuitry to store the source geometric model and the target geometric model.

8. The system of claim 5, wherein the computer programmable logic is associated with the processing circuitry and the interrupt interface, the computer programmable logic including a production control module operative to implement staged translation of the source geometric model into the target geometric model.

9. The system of claim 8, wherein the staged translation comprises:

computer programmable logic for extracting comparison reference data from the source geometric model in a source computer aided design (CAD) system;
computer programmable logic for generating a target geometric model in a target CAD system;
computer programmable logic for comparing reference data from the source geometric model with corresponding reference data in the target geometric model;
upon identification of a discrepancy in a feature of the target geometric model, computer programmable logic for iterating, a predetermined number of times, the process of generating the feature in the target geometric model; and
computer programmable logic for displaying the discrepancy to an operator at the client in the event of the server's failure to automatically correct a discrepancy in a feature of the target geometric model.

10. The system of claim 9, wherein the reference data for each feature from the source geometric model is compared with corresponding geometry in the translated target geometric model in order to identify discrepancies therebetween.

11. The system of claim 10, wherein the computer programmable logic for comparing reference data comprises program code for extracting point cloud data from the pre-existing source geometric model and comparing the extracted point cloud data with geometry in the translated target geometric model.

12. The system of claim 10, wherein the computer programmable logic for comparing reference data comprises program code for extracting point cloud data from the translated target geometric model from different points of reference excluding the referenced point cloud data as in claim 11, and comparing the said newly extracted point cloud data with geometry in the pre-existing source geometric model.

13. The system as in claim 9, wherein the computer programmable logic for generating a target geometric model comprises computer programmable logic for generating a user interrupt at the interrupt interface responsive to identifying a problem, in the event of the server's failure to automatically correct the identified problem, in generating the target geometric model.

14. A system for facilitating a staged translation of a pre-existing source geometric model in a first format in the source CAD system, to a translated target geometric model in a second format in the target CAD system, comprising:
a server configured to compare data of each of a plurality of features generated in a first format with translated target geometric data of respective features generated in a second format, the server operative to identify discrepancies in respective features therebetween, and further configured to automatically correct discrepancies of a feature, by selectively substituting from one of: 1) a group of all possible combinations of features, dimensions, sketches, parameters and definitions supported by the target CAD system, and 2) a group of all variations of features, dimensions, sketches, parameters and definitions supported by the target CAD system in an effort to resolve the discrepancy generated in the second format prior to generating another feature; and
at least one client communicating with the server over a communication link to enable a user to interact with the staged translation.

15. The system of claim 14, further comprising:
an interrupt interface configured to notify a user of the server's inability to automatically generate an accurate representation of a feature, generated from the first format, into the second format.

16. The system of claim 14, wherein the server includes a storage device to store data related to each of the plurality of features.

17. The system of claim 14, wherein the first and second formats are selected from the group having Pro/E, SDRC, Unigraphics, CATIA, SolidWorks, CATIA V5, and combinations thereof.

18. A multi-staged feature based translation system, comprising:
a client/server environment;
a client provided in the environment and having an interrupt interface; and
a server provided in the environment and communicating with the client via the environment and having processing circuitry and an operation manager configured to compare source geometric data related to each of a plurality of features in a source geometric model with target geometric data for corresponding features in a translated target geometric model;
wherein the server is further configured to correct feature discrepancies after generating the feature and prior to generating another feature.

19. The system of claim 18, further comprising:
an interrupt interface operative to notify a user of the presence of an identified discrepancy in response to the server's inability to correct the feature discrepancies after a predetermined number of iterations, using alternative measurements during each iteration, to accurately generate the feature.

20. The system of claim 18, wherein the operation manager further comprises program code for performing actions, including:
evaluating architecture of the pre-existing source geometric model including decomposing the pre-existing source geometric model.

21. The system of claim 18, further comprising:
computer programmable logic for examining constructions history detailing the manner in which the pre-existing source geometric model was built.

22. The system of claim 18, further comprising:
computer programmable logic for extracting the source geometric data for each of the plurality of features from the pre-existing source geometric model.

23. The system of claim 18, further comprising:
computer programmable logic for generating the target geometric data based upon a construction history used to create each of the plurality of features of the pre-existing source geometric model.

24. A feature based translation system for generating a desired translated target geometric model from a pre-existing source geometric model, comprising:
a processor having processing circuitry configured to compare source geometric data of each of a plurality of features in a pre-existing source geometric model with target geometric data of respective features in a translated target geometric model, and operative to identify discrepancies in respective features therebetween;
the processor further configured to rectify discrepancies in a feature after generating the feature and prior to generating another feature among the plurality of features by selectively substituting from one of: 1) a group of all possible combinations of features, dimensions, sketches, parameters and definitions supported by the target CAD system, and 2) a group of all variations of features, dimensions, sketches, parameters and definitions supported by the target CAD system in an effort to resolve the discrepancy.

25. The system of claim 24, further comprising:
an interrupt interface operative to notify a user of the processor's inability to automatically generate an accurate representation of a feature of the pre-existing source geometric model in the translated target geometric model.

26. The system of claim 24, wherein the processor is configured to iterate, a predetermined number of times using different methods during each iteration, the process of generating a feature.

27. The system of claim 25, wherein the interrupt interface notifies a user of the processor's inability to rectify a discrepancy in a feature after performing the predetermined number of iterations to accurately generate the feature.

28. The system of claim 25, wherein the interrupt interface notifies a user of the presence of any identified discrepancies that are not automatically corrected by the processor in response to comparing the geometric data of the pre-existing source geometric model and the desired target geometric model.

29. The system of claim 25, further comprising a computer readable medium having computer programmable logic embodied therein which when executed by the processing circuitry translates each feature of a pre-existing source geometric model to a respective feature in a translated target geometric model.

30. The system of claim 24, wherein the process is further configured to invoke point cloud analysis subsequent to comparing geometric data of pre-existing source and translated target models and identifying discrepancies in geometric features therebetween.

* * * * *